US009626307B2

(12) United States Patent
Kim

(10) Patent No.: US 9,626,307 B2
(45) Date of Patent: Apr. 18, 2017

(54) MOBILE DEVICE AND A METHOD OF CONTROLLING THE MOBILE DEVICE

(71) Applicant: SAMSUNG ELECTRONICS CO., LTD, Suwon-si, Gyeonggi-do (KR)

(72) Inventor: Ho-Sung Kim, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 272 days.

(21) Appl. No.: 14/303,860

(22) Filed: Jun. 13, 2014

(65) Prior Publication Data

US 2015/0026398 A1    Jan. 22, 2015

(30) Foreign Application Priority Data

Jul. 19, 2013    (KR) ........................ 10-2013-0085529

(51) Int. Cl.
G06F 12/00    (2006.01)
G06F 13/10    (2006.01)

(52) U.S. Cl.
CPC .... *G06F 13/102* (2013.01); *G06F 2213/3804* (2013.01); *Y02B 60/1228* (2013.01)

(58) Field of Classification Search
CPC .................................................. G11C 7/1006
See application file for complete search history.

(56) References Cited

U.S. PATENT DOCUMENTS

| | | | |
|---|---|---|---|
| 5,854,942 A | 12/1998 | Penokie | |
| 7,721,127 B2 | 5/2010 | Vishin et al. | |
| 7,895,453 B2 | 2/2011 | Kasahara et al. | |
| 7,937,568 B2 | 5/2011 | Correale, Jr. et al. | |
| 7,958,324 B2 | 6/2011 | Tokoro et al. | |
| 8,046,595 B2 | 10/2011 | Jun | |
| 2003/0204759 A1* | 10/2003 | Singh | G06F 1/3203 713/320 |
| 2006/0168261 A1 | 7/2006 | Serval et al. | |

(Continued)

FOREIGN PATENT DOCUMENTS

| | | |
|---|---|---|
| JP | 2004-171142 | 6/2004 |
| JP | 2009-289082 | 12/2009 |
| WO | 2008/045553 | 4/2008 |

OTHER PUBLICATIONS

Qualcomm White Paper, Snapdragon S4 Processors System on Chip Solutions for a New Mobile Age, 2011.*

(Continued)

*Primary Examiner* — Prasith Thammavong
*Assistant Examiner* — Edmund Kwong
(74) *Attorney, Agent, or Firm* — F. Chau & associates, LLC

(57) ABSTRACT

A mobile device including: a storage device; a system-on-chip (SOC) including a central processing unit (CPU) and a memory interface configured to access the storage device in response to a request of the CPU; and a working memory including an input/output (I/O) scheduler and a device driver, the I/O scheduler configured to detect real time processing requests and store the real time processing requests in a sync queue, and detect non-real time processing requests and store the non-real time processing requests in an async queue, the device driver configured to adjust the performance of the mobile device based on the number of requests in the sync queue.

22 Claims, 20 Drawing Sheets

(56) References Cited

U.S. PATENT DOCUMENTS

2010/0131791 A1  5/2010 Kimura
2012/0159024 A1  6/2012 Morita et al.

OTHER PUBLICATIONS

Paul Dix, Synchronous Reads, Asynchronous Writes, Ruby Conference 2009, Nov. 23, 2009.*
Anndrew Vacca, AT&T LG Optimus G review, http://www.androidcentral.com/att-Ig-optimus-g-review , Oct. 18, 2012.*
Jerry Hildenbrand, Android A to Z: What is a kernel?, http://www.androidcentral.com/android-z-what-kernel, Jan. 23, 2012.*
Gap-Joo Na, Task Scheduling for Multicore Embedded Devices, Embedded Linux Conference 2013, Feb. 22, 2013.*

* cited by examiner

Fig. 6

| SQ Size | QoS Step | | |
|---|---|---|---|
| | Step | CPU Frequency | MIF Frequency |
| 1~15 | 1st step | 2.0Ghz | 26MHz |
| 16~30 | 2nd step | 2.5GHz | 52MHz |
| more than 30 | 3rd step | 3.0GHz | 78MHz |

Fig. 9

| SQ Size | DVFS level | | |
| --- | --- | --- | --- |
| | Level | Voltage | Frequency |
| 1~15 | Default | 1.3V | 1.5GHz |
| 16~30 | $1^{st}$ | 1.5V | 2.0GHz |
| 31~40 | $2^{nd}$ | 1.7V | 2.5GHz |
| more than 40 | $3^{rd}$ | 2.0V | 3.0GHz |

| SQ Size | CPU mode | |
|---|---|---|
| | Mode | Activating Core |
| 1~5 | Little mode | LCore_1, LCore_2 | — |
| 6~15 | $1^{st}$ Big mode | — | BCore_1 |
| 16~30 | $2^{nd}$ Big mode | — | BCore_1, BCore_2 |
| more than 30 | $3^{rd}$ Big mode | LCore_1, LCore_2 | BCore_1, BCore_2 |

Fig. 15

| SQ | System Performance level | CPU Core | Activating Core | DVFS Level | QoS Step |
|---|---|---|---|---|---|
| 1~5 | Level_1 (default) | Little mode | LCore_1, LCore_2 | 1st DVFS Level of little core | 1st QoS Step of little core |
| 6~10 | Level_2 | Little mode | LCore_1, LCore_2 | 2nd DVFS Level of little core | 2nd QoS Step of little core |
| 11~30 | Level_3 | Little mode | LCore_1, LCore_2 | MAX DVFS Level of little core | MAX QoS Step of little core |
| 31~60 | Level_4 | Big mode | BCore_1, BCore_2 | 1st DVFS Level of big core | 1st QoS Step of big core |
| 61~100 | Level_5 | Big mode | BCore_1, BCore_2 | 2nd DVFS Level of big core | 2nd QoS Step of big core |
| More than 100 | Level_6 | Big mode | LCore_1, LCore_2, BCore_1, BCore_2 | MAX DVFS Level of big core | MAX QoS Step of big core |

US 9,626,307 B2

MOBILE DEVICE AND A METHOD OF CONTROLLING THE MOBILE DEVICE

CROSS-REFERENCE TO RELATED APPLICATION

This application claims priority under 35 U.S.C. §119 to Korean Patent Application No. 10-2013-0085529 filed Jul. 19, 2013, in the Korean Intellectual Property Office, the disclosure of which is incorporated by reference herein in its entirety.

BACKGROUND

Technical Field

The inventive concept relates to a semiconductor device, and more particularly, to a mobile device capable of controlling memory and system performances based on a number of requests to be processed and a method of controlling the mobile device.

Discussion of the Related Art

Mobile devices are increasingly being used. Examples of mobile devices include a smart phone, a tablet personal computer (PC), a digital camera, an MP3 player, a personal digital assistant (PDA), etc. An increase in driving of multimedia and throughput of various data accelerates the application of high-speed processors and mass storage media to such mobile devices. A variety of application programs are driven on a mobile device. To drive a variety of application programs, the mobile device includes semiconductor devices such as a working memory (e.g., dynamic random access memory (DRAM)), a nonvolatile memory, an application processor (AP), etc. As high performance is expected in a mobile environment, the degree of integration and driving frequencies of the above-mentioned semiconductor devices continuously rise.

In a mobile device, performances of a processing unit and a DRAM are rapidly being improved. However, a performance of a storage device, which is used as a nonvolatile storage medium, does not keep up with the performance improvements of the processing unit and the DRAM. Correspondingly, an overall performance of the mobile device that a user experiences is affected by an access speed to the storage device. For example, when the access speed to the storage device in a multi-tasking environment is slow, the quality of service (QoS) that the user experiences is lessened.

Various input/output scheduling techniques for the storage device are used to provide the user with high-quality services. In certain input/output scheduling techniques, a performance of a current access operation is based on a previous access parameter. However, such techniques may not be effective when an access request to the storage device rapidly increases or decreases.

SUMMARY

An exemplary embodiment of the inventive concept provides a mobile device comprising a storage device; a system-on-chip (SOC) including a central processing unit (CPU) and a memory interface configured to access the storage device in response to a request of the CPU; and a working memory including an input/output (I/O) scheduler and a device driver, the I/O scheduler configured to detect real time processing requests and store the real time processing requests in a sync queue, and detect non-real time processing requests and store the non-real time processing requests in an async queue, the device driver configured to adjust the performance of the mobile device based on the number of requests in the sync queue.

When the sync queue and the async queue are empty a low power mode of the mobile device is entered.

The CPU is a heterogeneous multi-core CPU.

The working memory includes a dynamic random access memory (DRAM).

The storage device includes a nonvolatile memory device.

The synch queue includes a plurality of read requests.

The async queue includes a plurality of write requests.

The device driver adjusts the performance of the mobile device by changing a frequency of a driving clock of the CPU and changing a frequency of a data transfer clock of the memory interface.

The device driver adjusts the performance of the mobile device by changing a driving voltage of the SOC and a frequency of a driving clock of the CPU.

The device driver adjusts the performance of the mobile device by changing a number of cores operating in the CPU.

An exemplary embodiment of the inventive concept provides a mobile device comprising a display screen configured to receive user input; a working memory including a module, the module including an I/O scheduler and a device driver, the I/O scheduler including an async request queue configured to store non-real time processing requests by the user input and a sync request queue configured to store real time processing requests by the user input, the device driver including a performance control module, the performance control module configured to select a performance control mode of the mobile device based on the number of requests stored in the sync queue.

The mobile device further comprises a CPU, and a memory interface configured to interface with a high speed data transfer device.

The high speed data transfer device is a storage device.

The performance control mode of the mobile device includes a dynamic voltage frequency scaling (DVFS) mode in which a driving voltage of the mobile device and a frequency of a driving clock of the CPU are adjusted.

The DVFS mode includes a plurality of levels, each level including a voltage and a frequency corresponding to a particular range of the number of requests in the synch queue, wherein a desired level is not activated until a prior activated level times out.

The performance control mode of the mobile device includes a quality of service (QOS) mode in which a frequency of a driving clock of the CPU and a frequency of a data transfer clock of the memory interface are adjusted.

The QOS mode includes a plurality of steps, each step including a CPU frequency and a memory interface frequency corresponding to a particular range of the number of requests in the synch queue, wherein a desired step is not activated until a prior activated step times out.

The performance control mode of the mobile device includes a CPU mode in which a number of cores operating in the CPU is adjusted.

The CPU mode includes a plurality of modes, each mode including a core of the CPU to be activated for a particular range of the number of requests in the synch queue, wherein a desired mode is not activated until a prior activated mode times out.

The display screen is a touch screen.

The module is a kernel.

An exemplary embodiment of the inventive concept provides a method of controlling a mobile device comprising storing real time processing requests in a sync queue and non real time processing requests in an async queue of an I/O scheduler of a working memory; determining, with a device driver of the working memory, a performance control mode of the mobile device based on the number of requests stored in the sync queue; increasing a data transfer rate between a memory interface and a storage device when the number of requests in the sync queue is greater than a predetermined threshold; and decreasing the data transfer rate between the memory interface and the storage device when the number of requests in the sync queue is less than the predetermined threshold.

The method further comprises entering a low power mode of the mobile device when the sync queue and the async queue are empty.

The sync queue includes a plurality of read requests and the async queue includes a plurality of write requests.

The performance control mode of the mobile device includes a CPU mode, a DVFS mode and a QOS mode.

The CPU mode is entered prior to the QOS mode and the DVFS mode.

BRIEF DESCRIPTION OF THE DRAWINGS

The above and other features of the inventive concept will become more apparent by describing in detail exemplary embodiments thereof with reference to the accompanying drawings, in which:

FIG. 6 is a table showing quality of service (QoS) steps according to an exemplary embodiment of the inventive concept;

FIG. 9 is a table showing a dynamic voltage frequency scaling (DVFS) mode corresponding to the number of requests in a sync queue, according to an exemplary embodiment of the inventive concept;

FIG. 15 is a table showing system performance levels corresponding to the number of requests in a sync queue, according to an exemplary embodiment of the inventive concept;

DETAILED DESCRIPTION OF THE EMBODIMENTS

Figure 1:
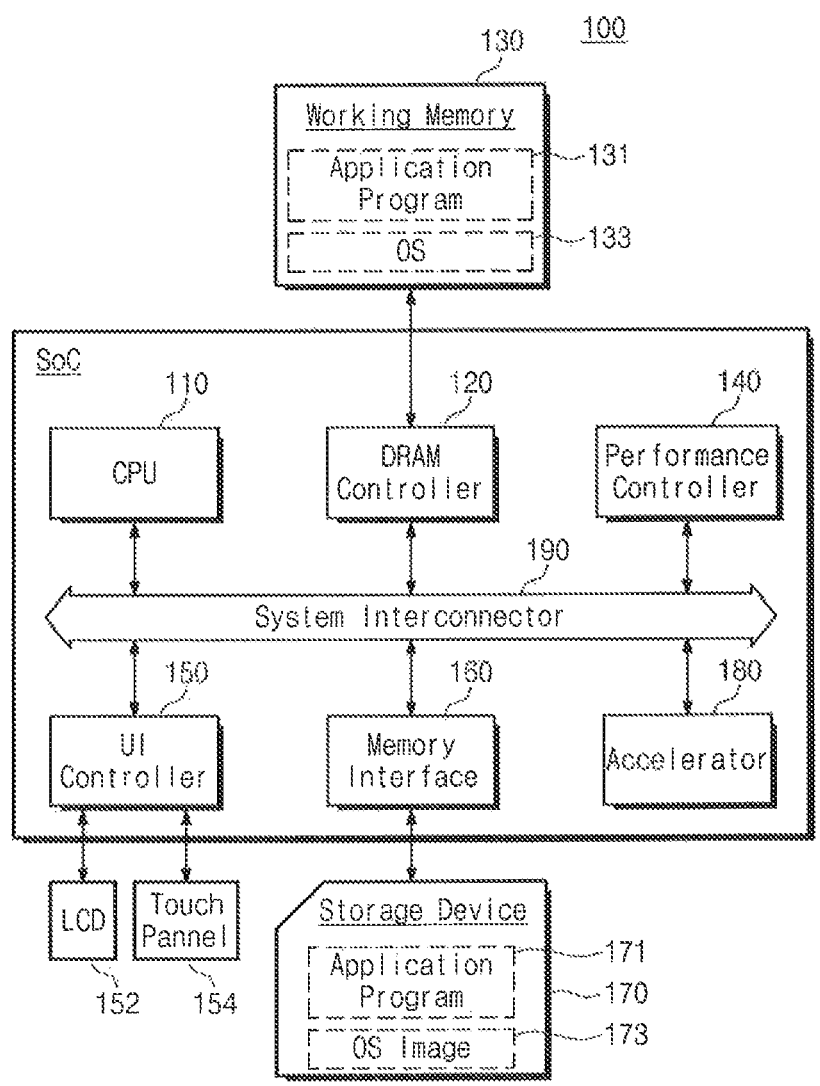
FIG. 1 is a block diagram illustrating a mobile device according to an exemplary embodiment of the inventive concept.

Hereinafter, exemplary embodiments of the inventive concept will be described in detail with reference to the accompanying drawings. The inventive concept, however, may be embodied in various different forms, and should not be construed as being limited only to the illustrated embodiments. Like reference numerals may denote like elements throughout the attached drawings and written description.

As used herein, the singular forms "a", "an" and "the" are intended to include the plural forms as well, unless the context clearly indicates otherwise.

It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a block diagram illustrating a mobile device according to an exemplary embodiment of the inventive concept. Referring to FIG. 1, a mobile device 100 includes a system on chip (SoC), a working memory 130, a liquid crystal display device 152, a touch panel 154, a storage device 170, etc. The SoC includes a central processing unit (CPU) 110, a dynamic random access memory (DRAM) controller 120, a performance controller 140, a user interface controller 150, a memory interface 160, an accelerator 180, etc. Components of the mobile device 100 may not be limited to this disclosure. For example, the mobile device 100 may further comprise a hardware codec to process image data, a security block, etc.

The CPU 110 may execute software (e.g., an application program, an operating system, device drivers, etc.) to be performed on the mobile device 100. The CPU 110 may execute an operating system (OS) loaded onto the working memory 130. The CPU 110 may execute a variety of OS-based application programs. The CPU 110 may be implemented by a homogeneous multi-core processor or a heterogeneous multi-core processor. A multi-core processor may be a computing component having at least two processors (hereinafter, referred to as cores) that are independently driven. The cores read and execute program instructions independently.

The DRAM controller 120 provides an interface between the working memory 130 and the SoC. The DRAM controller 120 accesses the working memory 130 in response to a request of the CPU 110 or another device. For example, the DRAM controller 120 writes data in the working memory 130 in response to a write request of the CPU 110. The DRAM controller 120 reads data from the working memory 130 in response to a read request of the CPU 110, and may transfer the read data to the CPU 110 or the memory interface 160 through a data bus.

The working memory 130 is used to load basic application programs 131 and an OS 133. For example, when the mobile device 100 is booted up, an OS image 173 stored in the storage device 170 may be loaded into the working memory 130 according to a booting sequence. All input/output operations of the mobile device 100 are supported by the OS 133. Likewise, application programs selected by a user or providing a basic service are loaded into the working memory 130. Furthermore, the working memory 130 may be used as a buffer memory that stores image data provided from an image sensor such as a camera.

The performance controller 140 adjusts operation parameters of the SoC in response to a control request from the OS 133. For example, to improve a performance of the SoC, the performance controller 140 may adjust a Dynamic Voltage Frequency Scaling (DVFS) level or select a driving mode of a multi-core such as big.LITTLE and a frequency of a driving clock of the CPU 110.

The user interface controller 150 controls user inputs and outputs via user interface devices. For example, the user interface controller 150 may display a keyboard screen for inputting data on the liquid crystal display device 152 under a control of the CPU 110. Or, the user interface controller 150 may control the liquid crystal display device 152 to display data requested by a user. The user interface controller 150 decodes data provided from a user input means such as the touch panel 154 to user input data.

The memory interface 160 accesses the storage device 170 in response to a request of the CPU 110. In other words, the memory interface 160 may provide an interface between the SoC and the storage device 170. For example, data processed by the CPU 110 may be stored in the storage device 170 through the memory interface 160. Data stored in the storage device 170 may be provided to the CPU 110 through the memory interface 160. In particular, the memory interface 160 accesses the storage device 170 using an access mode determined by the CPU 110.

The storage device 170 may be used as a storage medium of the mobile device 100. The storage device 170 stores application programs 171, the OS image 173, and various data. The storage device 170 may be a memory card (e.g., multimedia card (MMC), embedded MMC (eMMC), secure digital (SD), MicroSD, etc.). The storage device 170 may include a NAND flash memory having a mass storage capacity. Or, the storage device 170 may include next-generation nonvolatile memories (e.g., phase change RAM (PRAM), magnetoresistive RAM (MRAM), resistive RAM (ReRAM), ferroelectric (FRAM), etc.) or a NOR flash memory. In exemplary embodiments of the inventive concept, the storage device 170 may be an embedded memory included in the SoC.

The accelerator 180 is a separate device used to improve a multimedia processing speed or a multimedia data processing speed. For example, the accelerator 180 may be a device used to improve a performance of processing texts, audios, still images, animations, videos, two-dimensional data or three-dimensional data.

A system interconnector 190 is a system bus for providing an on-chip network in the SoC. The system interconnector 190, for example, may include a data bus, an address bus, and a control bus. The data bus is a path where data is transferred. The data bus may mainly provide a memory access path to the working memory 130 or the storage device 170. The address bus provides an address exchange path between devices. The control bus provides a path where control signals are transferred between devices. However, components of the system interconnector 190 may not be limited to components described above. For example, the system interconnector 190 may further comprise an arbitration means for efficient management.

In accordance with exemplary embodiments of the inventive concept, the mobile device 100 adjusts an access speed to the storage device 170 according to the number of requests accumulated in a sync queue. In accordance with exemplary embodiments of the inventive concept, the mobile device 100 adjusts a processing speed of the CPU 110 according to the number of requests accumulated in a sync queue. A system performance is accurately set according to a variation in throughput of data to be processed by determining an access speed to the storage device 170 or an operation speed of the SoC according to the size of a sync queue to be processed. Here, the sync queue may include work requests necessitating real-time processing. The sync queue may be a high priority queue. On the other hand, work requests not necessitating real-time processing may be included in an async queue. The async queue may be a low priority queue.

Figure 2:
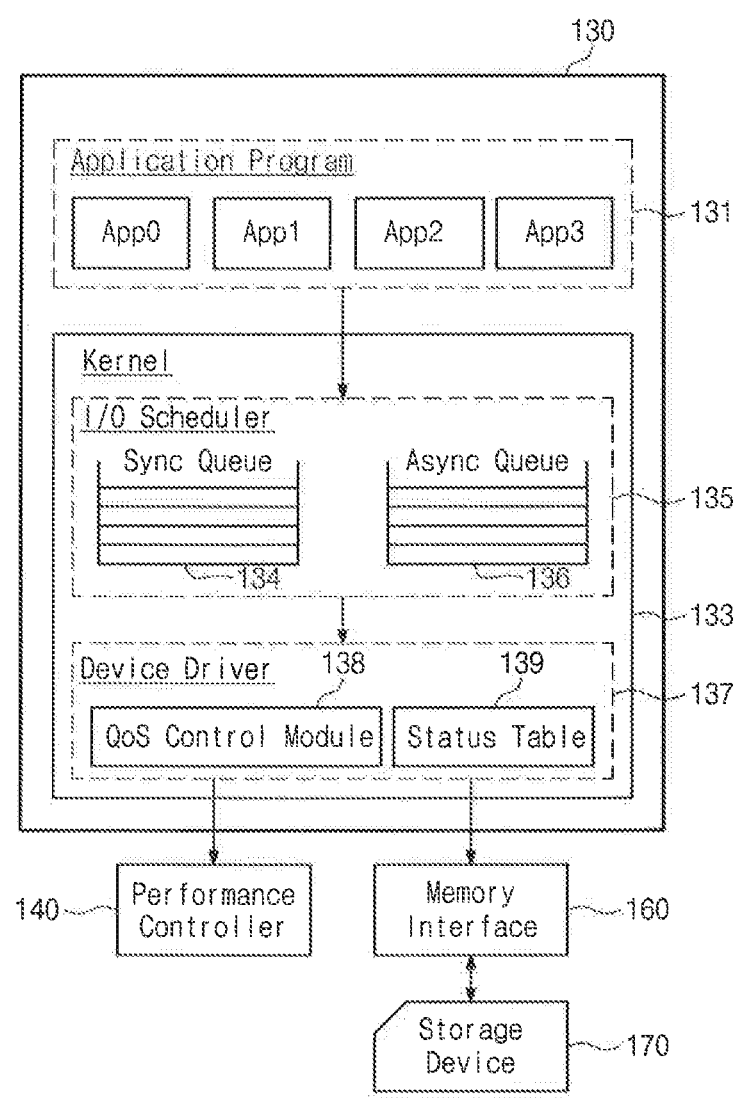
FIG. 2 is a block diagram illustrating a software structure of a mobile device in FIG. 1, according to an exemplary embodiment of the inventive concept.

FIG. 2 is a block diagram illustrating a software structure of the mobile device 100 in FIG. 1, according to an exemplary embodiment of the inventive concept. Referring to FIG. 2, a software hierarchical structure of the mobile device 100 loaded onto a working memory 130 and driven by the CPU 110 is divided into an application program 131 and a kernel 133. The kernel 133 is divided into an input/output scheduler 135 and a device driver 137. The device driver 137 is configured to detect the number of requests accumulated in a sync queue 134 or the number of requests accumulated in an async queue 136 managed by the input/output scheduler 135. The device driver 137 adjusts a frequency of a data transfer cock of a memory interface 160 or a frequency of a driving clock of the CPU 110.

The application program 131 may be driven as a basic service or be software of an upper layer driven according to a request of a user. A plurality of application programs App0, App1, App2, and App3 are simultaneously executed to provide various services. The application programs App0, App1, App2, and App3 are loaded into the working memory 130 and then executed. If a user requests a playback of a moving picture file, an application program (e.g., a video player) for playing a moving picture back is executed. The executed video player generates a read or write request on a storage device 170 to play a moving picture requested by the user.

The kernel 133 is a component of the OS, and performs a control operation between the application program 131 and hardware. The kernel 133 may include program execution, interrupt, multi-tasking, memory management, file system, device driver, etc. In exemplary embodiments of the inventive concept, the input/output scheduler 135 and the device driver 137 for performing a part of functions of the kernel 133 will now be described.

When a memory access is requested by the application program 131 or by an input of a user, the input/output scheduler 135 adjusts priorities of a plurality of requests. The input/output scheduler 135 manages a plurality of access requests using the sync queue 134 and the async queue 136. The sync queue 134 accumulates requests where user service is problematic when rapid processing is delayed. In other words, the sync queue 134 buffers access requests necessitating real-time processing for good system performance. On the other hand, the async queue 136 buffers requests not affecting the quality of service although processing is delayed. Access requests to a memory included in the sync queue 134 always have to be processed prior to requests included in the async queue 136.

The device driver 137 is a control module for controlling the storage device 170 at an OS level. When a memory access is requested by a user or the application program 131, the device driver 137 is called. The device driver 137 may be a software module of the kernel 133 for controlling the storage device 170.

The device driver 137 includes a quality of service (QoS) control module 138. The QoS control module 138 monitors the sync queue 134 or the async queue 136 managed by the input/output scheduler 135. The QoS control module 138 changes a driving condition of the storage device 170 or the SoC based on the number of requests accumulated in the sync queue 134.

For example, the QoS control module 138 compares the number of requests accumulated in the sync queue 134 with reference values and adjusts a frequency of a data transfer clock of the storage device 170 according to the comparison result. Alternatively, the QoS control module 138 compares the number of requests accumulated in the sync queue 134 with the reference values and adjusts a performance of the SoC according to the comparison result. If the number of requests accumulated in the sync queue 134 excessively increases, the QoS control module 138 controls the memory interface 160 such that a frequency of the data transfer clock of the storage device 170 rises. Or, if the number of requests accumulated in the sync queue 134 excessively increases, the QoS control module 138 controls the performance controller 140 such that a DVFS mode of the SoC is adjusted.

The device driver 137 forms a status table 139. Storing and updating of a QoS step, a DVFS level, a CPU mode, etc. set by the QoS control module 138 are performed using the status table 139. The status table 139 stores an update point of time on a QoS step, a DVFS level, a CPU mode, etc. Further, the status table 139 stores the number of requests in the sync queue 134 corresponding to the update point of time.

The performance controller 140 adjusts operation parameters of the SoC in response to a control of the device driver 137. For example, to improve a performance of the SoC, the performance controller 140 may adjust a DVFS level or control a driving mode of a homogeneous or heterogeneous multi-core such as big.LITTLE and a frequency of a driving clock of the CPU 110.

Here, the storage device 170 may be an MMC or an eMMC described above. However, the storage device 170 may be a type of volatile or nonvolatile storage.

Figure 3:
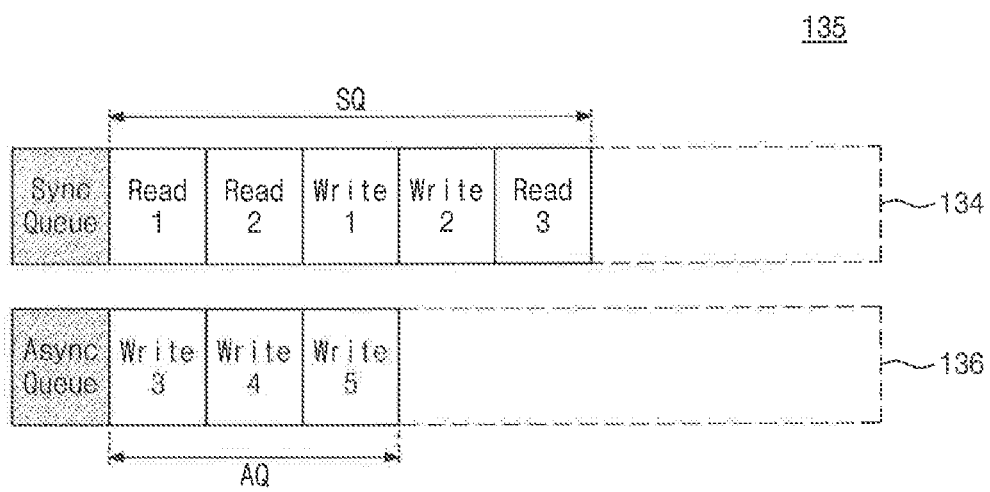
FIG. 3 is a diagram illustrating a queue configuring method of an input/output scheduler of FIG. 2, according to an exemplary embodiment of the inventive concept.

FIG. 3 is a diagram illustrating a queue configuring method of the input/output scheduler 135 of FIG. 2, according to an exemplary embodiment of the inventive concept.

In FIG. 3, there are illustrated a sync queue 134 and an async queue 136 of the input/output scheduler 135 on the storage device 170 of a plurality of block devices.

The input/output scheduler 135 manages read or write requests on the storage device 170, generated according to an input of a user or a request of an application program, using the sync queue 134 and the async queue 136. Although not shown, the sync queue 134 and the async queue 136 may be managed using a separate input/output buffer. The input/output buffer may be formed of the working memory 130 or of a separate static RAM (SRAM) included in the SoC. Or, the input/output buffer may be included in the memory interface 160.

The sync queue 134 is configured to accumulate read or write requests necessitating real-time processing. If a read or write request in the sync queue 134 is not immediately processed, an overall performance of the mobile device 100 is lowered. In addition, if a read or write request in the sync queue 134 is not immediately processed, there is a disruption in operation speed that a user experiences. Thus, a write request in which a user experiences a drop in performance when it is not rapidly performed may be stored in the sync queue 134.

Requests necessitating real-time processing, for example, requests for processing a moving picture or multimedia data may be stored in the sync queue 134. All requests which are generated according to a request of a user and to which the user waits for a response may be stored in the sync queue 134. The sync queue 134 is configured to store memory access requests generated when a user touches an address book, executes a gallery or magnifies a particular image and when the user executes a moving picture or a music file. In addition, memory access requests generated when a user instructs a forward function during a playback of a multimedia file or when the user instructs a jump function during a playback of a multimedia file are stored in the sync queue 134. In addition, memory access requests generated when a user touches a home screen to move a page are stored in the sync queue 134.

The async queue 136 is configured to accumulate requests not necessitating real-time processing. Write requests having a relatively low priority may be stored in the async queue 136, for example. A write request capable of being processed in the background or at idle time may be stored in the async queue 136.

For example, the sync queue 134 buffers read requests Read1, Read2, and Read3 and write requests Write1 and Write2, and the async queue 136 buffers write requests Write3, Write4, and Write5. Here, read requests included in the sync queue 134 may correspond to read requests that must be performed to perform a write request. For example, the read requests Read1 and Read2 may have to be performed prior to performing the write requests Write1, Write2, and Write3.

Here, the QoS control module 138 of the device driver 137 continues to monitor the number of requests (e.g., SQ) accumulated in the sync queue 134. The QoS control module 138 may perform a control operation for improving the quality of service by applying a plurality of reference values to the number of requests accumulated SQ in the sync queue 134. The QoS control module 138 compares the number of requests SQ with reference values to adjust a frequency of a data exchange clock of the memory interface 160, or controls the performance controller 140 to adjust a performance of the CPU 110 or a DVFS level of the SoC. Such operations will be more fully described with reference to exemplary embodiments of the inventive concept to be described below.

Figure 4:
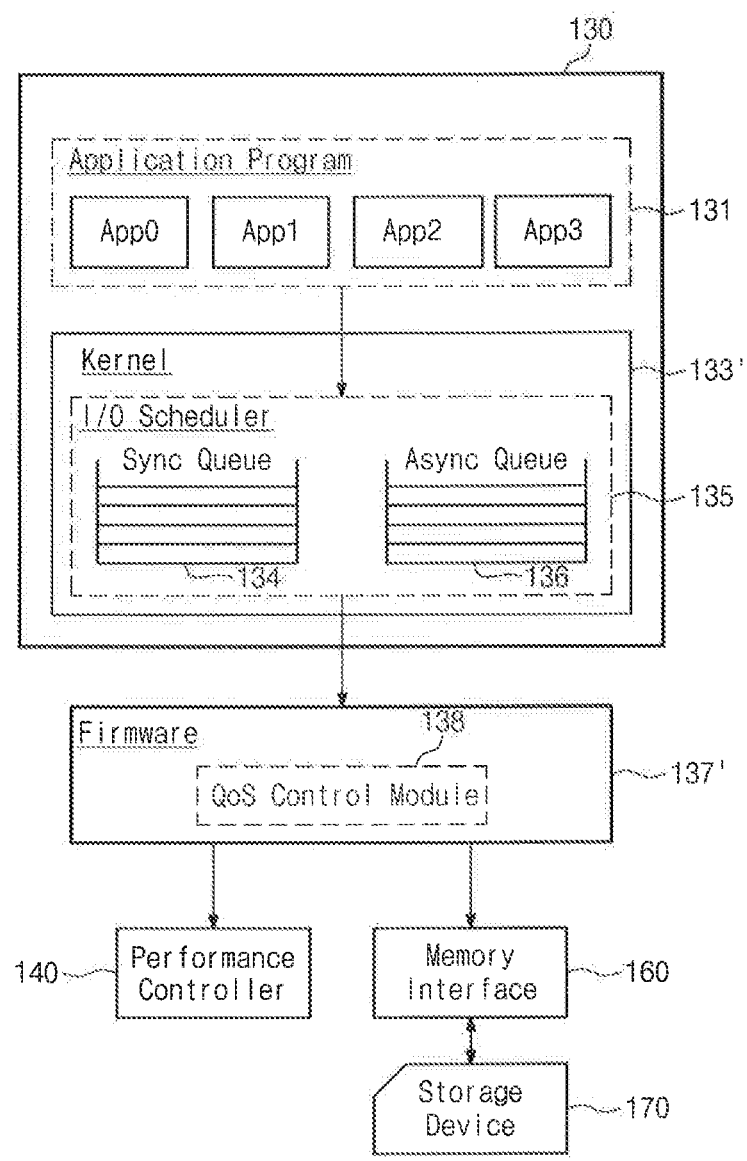
FIG. 4 is a block diagram illustrating a software hierarchical structure of a mobile device according to an exemplary embodiment of the inventive concept.

FIG. 4 is a block diagram illustrating a software hierarchical structure of a mobile device according to an exemplary embodiment of the inventive concept. Referring to FIG. 4, firmware 137' monitors the number of requests accumulated in a sync queue 134 or the number of requests accumulated in an async queue 136 managed by an input/output scheduler 135 of a kernel 133'. A QoS control module 138 included in the firmware 137' controls a memory interface 160 or a performance controller 140.

An application program 131 and functions of the input/output scheduler 135 of the kernel 133' of working memory 130 are substantially the same as those described with reference to FIG. 2, and a description thereof is thus omitted. A device driver module is further included in a lower layer of the input/output scheduler 135 of the kernel 133'. A device driver included in the kernel 133' does not control the memory interface 160 or the performance controller 140.

Instead, the firmware 137' monitors the number of requests accumulated in the sync queue 134 and controls a performance of the SoC and a channel bandwidth of a storage device 170 according to the monitoring result. The firmware 137' includes the QoS control module 138. The QoS control module 138 monitors the sync queue 134 or the async queue 136 managed by the input/output scheduler 135. The QoS control module 138 changes a driving condition of the storage device 170 or the SoC according to the number of requests accumulated in the sync queue 134.

The firmware 137' may further comprise a status table in addition to the QoS control module 138. Storing and updating of a QoS step, a DVFS level, a CPU mode, etc. set by the QoS control module 138 may be performed using the status table. The status table may store an update point of time for a QoS step, a DVFS level, a CPU mode, etc. Further, the status table may store the number of requests in the sync queue 134 corresponding to the update point of time. In other words, the firmware 137' may perform a function of the device driver 137 in FIG. 2. The firmware 137' may be loaded onto a particular device of the SoC and then driven. The firmware 137' may be loaded onto the performance controller 140 or the memory interface 160 and then driven.

The performance controller 140 adjusts operation parameters according to a control of the firmware 13T. For example, to improve a performance of the SoC, the performance controller 140 may adjust a DVFS level or control a driving mode of a homogeneous or heterogeneous multi-core such as big.LITTLE and a frequency of the driving clock of the CPU 110.

Figure 5:
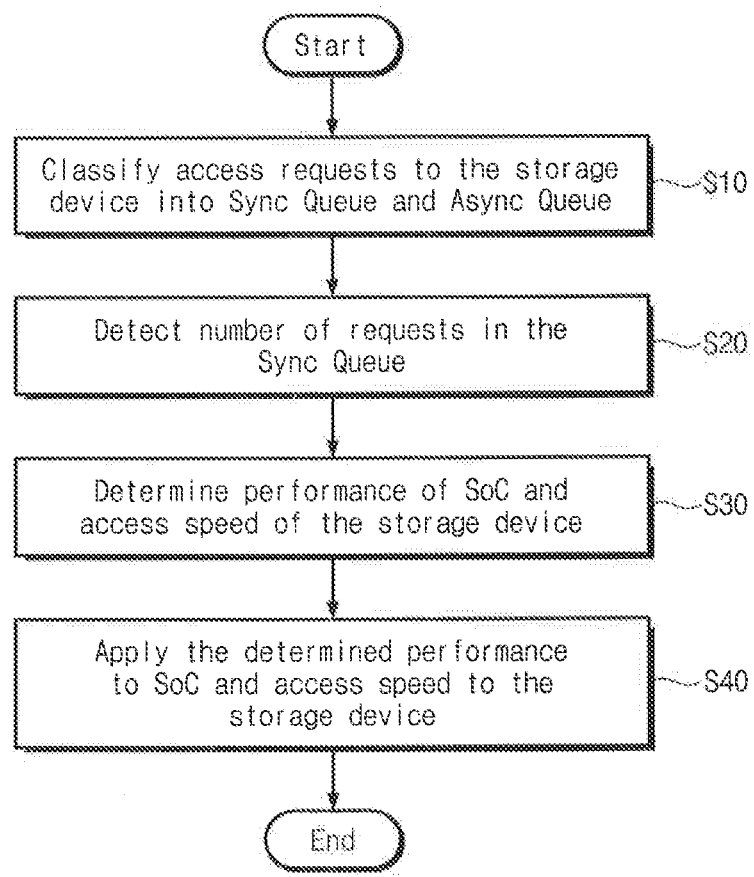
FIG. 5 is a flow chart illustrating a method of controlling performances of a system-on-chip (SoC) and a storage device based on the size of a sync queue, according to an exemplary embodiment of the inventive concept.

FIG. 5 is a flow chart illustrating a method of controlling performances of a SoC and a storage device based on the size of a sync queue, according to an exemplary embodiment of the inventive concept. A method of adjusting a performance of a mobile device 100 like that of FIG. 1 based on a variation in the number of requests in the sync queue 134 will be described with reference to FIGS. 2 and 5.

In step S10, the input/output scheduler 135 classifies access requests to the storage device 170 generated on a SoC like that of FIG. 1 using the sync queue 134 and the async queue 136. The input/output scheduler 135 forms the classified queues on an input/output buffer.

In step S20, the device driver 137 detects the number of requests in the sync queue 134 formed by the input/output scheduler 135.

In step S30, the device driver 137 determines a performance of the SoC or an access speed of the storage device 170 corresponding to the number of requests in the sync queue 134. The device driver 137 may manage a status table to define a performance of the SoC or an access speed of the storage device 170 corresponding to the number of requests detected in the sync queue 134.

In step S40, the device driver 137 may set an operation speed or performance of the SoC to the performance of the SoC determined. For example, the device driver 137 may adjust a DVFS mode of the SoC, a driving frequency of a CPU 110 like that of FIG. 1, the number of activated cores of a homogeneous or heterogeneous multi-core CPU, etc. Such adjustment may be controlled by the performance controller 140 described with reference to FIG. 2. To adjust an access speed of the storage device 170, the device driver 137 controls a channel bandwidth of the memory interface 160. The device driver 137 may control a read or write speed of the storage device 170 to adjust an access speed of the storage device 170.

There is described a method of controlling an active performance of the mobile device 100 by varying an access speed to the storage device 170 and a performance of the SoC based on the number of requests accumulated in the sync queue 134. A data processing speed of the SoC and a frequency of the memory interface 160 may be adjusted according to the number of access requests in the sync queue 134. In this case, a performance may be optimized at a point of time when an access request is scheduled by the sync queue 134. Thus, it is possible to optimize the quality of service or device performance that a user feels.

FIG. 6 is a table showing QoS steps according to an exemplary embodiment of the inventive concept. Referring to FIGS. 1, 2 and 6, frequencies of driving clocks of the storage device 170 and the CPU 110 of the SoC may be dynamically adjusted according to the number of urgent access requests accumulated in the sync queue 134 (or SQ in the table of FIG. 6).

It is assumed that the number of QoS steps managed by the QoS control module 138 according to an exemplary embodiment of the inventive concept is 3. However, it is understood that the number of QoS steps can be changed to 2 or to 4 or more.

When the number of requests in the sync queue 134 is between 1 and 15, the QoS control module 138 selects a first step as the QoS step. When the number of requests in the sync queue 134 is between 16 and 30, the QoS control module 138 selects a second step as the QoS step. When the number of requests in the sync queue 134 is more than 30, the QoS control module 138 selects a third step as the QoS step.

When the first step is selected, a CPU clock frequency is set to 2.0 GHz and a memory interface frequency is set to 26 MHz. The CPU clock frequency may be a maximum operation frequency of the CPU 110. The memory interface frequency may be a maximum frequency of a data transfer clock between the storage device 170 and the memory interface 160. When the second step is selected, the CPU clock frequency is set to 2.5 GHz and the memory interface frequency is set to 52 MHz. When the third step is selected, the CPU clock frequency is set to 3.0 GHz and the memory interface frequency is set to 78 MHz. The QoS step may further comprise a step lower or higher than the first to third steps.

The higher the QoS step, the higher an operation frequency. Thus, the power required to perform an operation requested by a user may increase. However, as a computing speed of the CPU 110 and an access speed to the storage device 170 rise, the requested tasks may be rapidly processed. Thus, when the higher QoS step is selected, instant power consumption may increase. On the other hand, power consumed to process a particular task may decrease. In addition, since a processing speed that a user feels at the higher QoS step is high, the quality of service may be improved.

Figure 7:
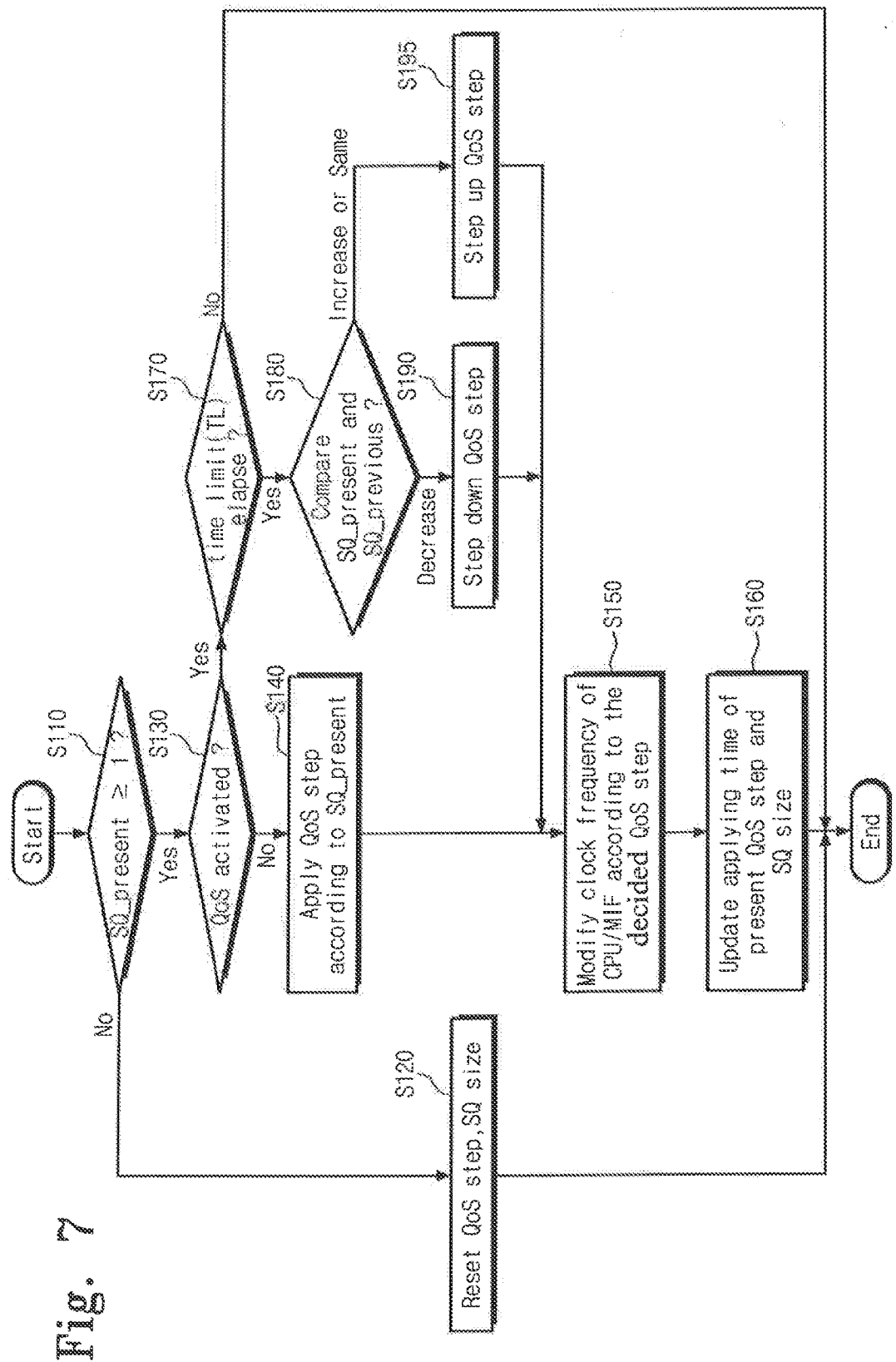
FIG. 7 is a flow chart illustrating a QoS step adjusting method according to an exemplary embodiment of the inventive concept.

FIG. 7 is a flow chart illustrating a QoS step adjusting method according to an exemplary embodiment of the inventive concept. In describing FIG. 7, component references may be made with reference to FIGS. 1 and 2. Referring to FIG. 7, there is described an embodiment in which a QoS step is changed according to a variation in the number of requests accumulated in the sync queue 134. A QoS control operation according to an exemplary embodiment of the inventive concept starts when the device driver 137 or the QoS control module 138 included in the device driver 137 checks a status of the input/output scheduler 135.

In step S110, the device driver 137 detects the size of requests SQ_present (hereinafter, also referred to as current sync queue size) included in the sync queue 134 and currently maintained in the input/output scheduler 135. When the sync queue 134 does not include a request, the method proceeds to step S120. When the sync queue 134 includes at least one request, the method proceeds to step S130.

In step S120, the device driver 137 resets a current QoS step in a status table managed for control to a default value or resets a size value of the sync queue 134. The device driver 137 terminates a QoS control operation based on the current sync queue size SQ_present. In FIG. 7, there are described a QoS size detecting operation and a QoS step control operation according to the detection result. However, the QoS size detecting operation may be performed periodically or within a particular time after a QoS step is adjusted.

In step S130, when the synch queue 134 includes at least one request, the device driver 137 detects whether a QoS control operation according to a previous sync queue size SQ_previous is activated. When the previous QoS control operation is at an inactive state, the method proceeds to step S140. When the previous QoS control operation is at an active state, the method proceeds to step S170. Since a QoS step to be applied to a current QoS control operation is determined according to whether a previous QoS control operation is completed, whether the previous QoS control operation is still activated may be checked. In other words, if a time limit TL when a previous QoS control operation is performed does not elapse, a QoS step may not be changed.

In step S140, the device driver 137 applies a QoS step according to the current sync queue size SQ_present. For example, when the current sync queue size SQ_present is 25, a second step may be selected and used as the QoS step on the basis of the table of FIG. 6.

In step 150, the device driver 137 modifies a frequency of an operation clock of the CPU 110 of the SoC and a clock frequency of the memory interface 160 according to the QoS step selected. For example, to apply the second step as the QoS step, the device driver 137 may adjust a driving clock frequency of the CPU 110 to 2.5 GHz with the performance controller 140. To apply the second step as the QoS step, the device driver 137 may adjust a clock frequency of the memory interface 160 to 52 MHz.

In step S160, the device driver 137 updates the status table with the current QoS step and a time when the current QoS step is applied. Information on the current QoS step and its applied point of time stored in the status table may be referred to in a following QoS control operation.

In operation S170, the device driver 137 detects an execution time of a QoS control operation activated by the previous sync queue size SQ_previous. The device driver 137 may detect whether an execution time of a QoS control operation corresponding to the previous sync queue size SQ_previous exceeds a time limit TL. Here, the time limit TL may be set to half a timeout or less than half the timeout. If the time limit TL does not elapse after a start of the QoS control operation activated by the previous sync queue size SQ_previous (No), the QoS control operation based on the current sync queue size SQ_present ends.

If the time limit TL elapses after the start of the QoS control operation activated by the previous sync queue size SQ_previous (Yes), the method proceeds to step S180, in which the QoS control operation corresponding to the previous sync queue size SQ_previous is activated. The reason for this may be that the QoS control operation corresponding to the previous sync queue size SQ_previous has been sufficiently performed.

In step S180, the device driver 137 compares the current sync queue size SQ_present and the previous sync queue size SQ_previous. The device driver 137 may detect the previous sync queue size SQ_previous based on a separately managed status table and compare the current sync queue size SQ_present with the previous sync queue size SQ_previous. If the current sync queue size SQ_present is less than the previous sync queue size SQ_previous, the method proceeds to step S190. If the current sync queue size SQ_present is more than the previous sync queue size SQ_previous or the same as the previous sync queue size SQ_previous, the method proceeds to step S195.

In step S190, the device driver 137 steps down the QoS step activated by the previous sync queue size SQ_previous. The reason for this may be that the number of requests accumulated in the sync queue 134 decreased while processing at the QoS control operation activated by the previous sync queue size SQ_previous. In step S195, the device driver 137 steps up the QoS step activated by the previous sync queue size SQ_previous. The reason for this may be that a higher processing speed is required due to an increase in the number of requests accumulated in the sync queue 134 while processing at the QoS control operation activated by the previous sync queue size SQ_previous.

There is described a method in which a dynamic performance of the mobile device 100 is controlled by changing a CPU driving frequency the SoC and a frequency of a data transfer clock of the storage device 170 according to the number of requests accumulated in the sync queue 134. When a frequency of the CPU 110 or the memory interface 160 is dynamically adjusted according to the number of requests accumulated in the sync queue 134, the mobile device 100 may be set to an optimal performance at a point of time when access requests included in the sync queue 134 are executed. Thus, it is possible to optimize the quality of service or performance a user feels.

Figure 8:
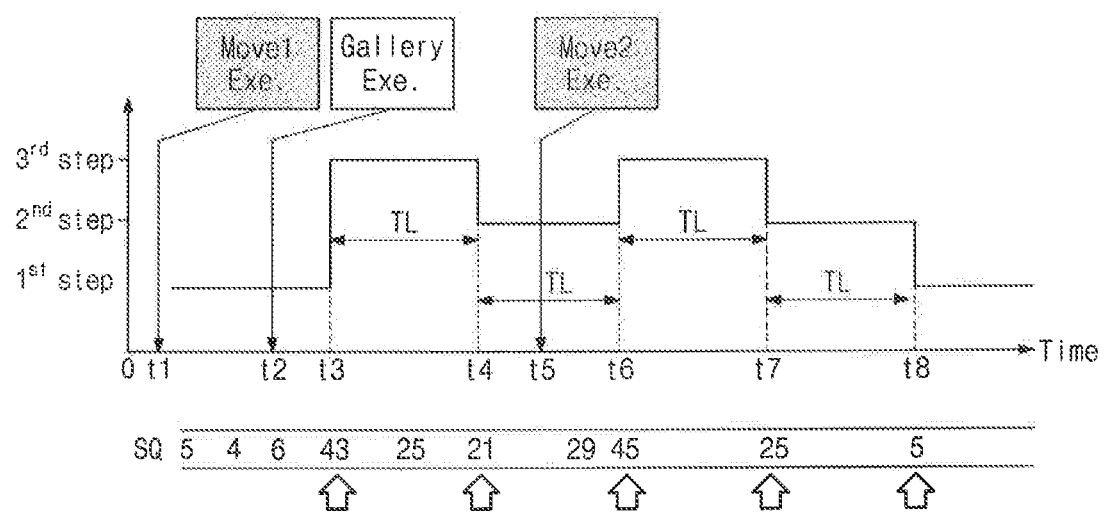
FIG. 8 is a timing diagram illustrating a variation in a sync queue according to a QoS control operation of FIG. 7, according to an exemplary embodiment of the inventive concept.

FIG. 8 is a timing diagram illustrating a variation in a sync queue according to a QoS control operation of FIG. 7, according to an exemplary embodiment of the inventive concept. In describing FIG. 8, component references may be made with reference to FIGS. 1 and 2. Referring to FIG. 8, as a QoS step increases or decreases according to the number of requests in a sync queue SQ, a variation in the QoS step may be synchronized with a processing point of time of data to be processed. It is assumed that at an initial time (0), the number of requests in the sync queue SQ is 5 and the QoS step is a first step. The first step may be that shown in FIG. 6.

At t1, a user requests a playback of a moving picture file. At this time, an application program for a playback of the moving picture file is executed and a plurality of read and write requests is generated to load the moving picture file. In this case, the number of requests in the sync queue SQ increases. However, the parameters of the first step are enough to process a single task such as the playback of the moving picture file. Thus, the number of requests in the sync queue SQ does not increase sharply.

At t2, the user executes a gallery program. At this time, multi-processing of playing the moving picture back and loading image files is required. Thus, the number of urgent write or read requests for the multi-processing increases sharply. The parameters of the first step may not be able to quickly process this increase in read or write requests. Thus, the number of requests in the sync queue SQ managed by the input/output scheduler 135 gradually increases.

At t3 when the number of requests in the sync queue SQ is 43, the device driver 137 sets the QoS step to a third step. The third step may be that shown in FIG. 6. Then, an access speed of the memory interface 160 to the storage device 170 rises, and a computing speed of the CPU 110 is maximized. Thus, the number of requests in the sync queue SQ gradually decreases. As illustrated in FIG. 8, the number of requests in the sync queue SQ gradually decreases as follows: (43→25→21).

If a time limit TL elapses from t3, it is possible to change the QoS step. Thus, at t4, the device driver 137 sets the QoS step to a second step based on the number of requests in the sync queue SQ managed by the input/output scheduler 135. The second step may be that shown in FIG. 6. The reason for this may be that the number of requests in the sync queue SQ detected at t4 corresponds to the second step of the QoS step illustrated in FIG. 6. To apply the second step, under a control of the device driver 137, an operation frequency of the CPU 110 is changed to 2.5 GHz and a frequency of a data transfer clock of the memory interface 160 is changed to 52 MHz.

It is assumed that at t5 the user plays another moving picture file back. Then, three tasks for a playback of a running moving picture file, an execution of a gallery file and a playback of an additional moving picture file are simultaneously performed. Thus, read and write requests for multi-tasking (e.g., three tasks) increase rapidly. This increase in the number of read and write requests causes the number of requests in the sync queue SQ to increase as well. However, t5 is a point of time before the time limit TL of the prior QoS step elapses. Thus, the device driver 137 may monitor the number of requests in the sync queue SQ until t6. The number of requests in the sync queue SQ reaches 45 at t6.

At t6, since the time limit TL of the prior QoS step elapses, it is possible to change the QoS step to correspond to a current sync queue size SQ. Since the current sync queue size SQ corresponds to 45, the QoS step is changed to the third step under a control of the device driver 137. As the QoS step is changed to the third step, an operation frequency of the CPU 110 is changed to 3.0 GHz and a frequency of the data transfer clock of the memory interface 160 is changed to 78 MHz. As a processing speed of the CPU 110 and an access speed to the storage device 170 are improved, the number of requests in the sync queue SQ to be urgently processed decreases gradually. At t7, the number of requests in the sync queue SQ again decreases to 25.

At t7, since the current sync queue size SQ detected corresponds to 25, the QoS step is switched to the second step under a control of the device driver 137. At t8 when the time limit TL that began at t7 elapses, the device driver 137 sets the QoS step to the first step in which the current sync queue size SQ corresponds to 5.

There is described a data processing method according to an exemplary embodiment of the inventive concept where an access speed to the storage device 170 and a processing speed of the CPU 110 are determined according to the number of requests in the sync queue SQ to be processed. As the access speed to the storage device 170 is varied according to the number of requests in the sync queue SQ to be immediately processed, a memory access condition is optimized at a point of time when a read or write operation corresponding to an actual sync queue is carried out. In addition, it is possible to effectively process memory access requests to be processed by adjusting a processing speed of the CPU 110.

FIG. 9 is a table showing a DVFS mode corresponding to the number of requests in a sync queue, according to an exemplary embodiment of the inventive concept. In describing FIG. 9, component references may be made with reference to FIGS. 1 and 2. Referring to FIG. 9, a DVFS mode of the SoC is changed according to the number of requests in a sync queue SQ necessitating urgent processing.

It is assumed that a DVFS level managed by the device driver 137 or the QoS control module 138 according to an exemplary embodiment of the inventive concept is divided into four modes. However, it is understood that the DVFS level may be divided into two modes, three modes or five or more modes.

When the number of requests in the sync queue SQ is between 1 and 15, the QoS control module 138 selects a default mode as the DVFS level. In the default mode, a driving voltage of the SoC is set to 1.3V and a frequency of a driving clock is set to 1.5 GHz. When the number of requests in the sync queue SQ is between 16 and 30, the QoS control module 138 selects a first mode as the DVFS level. In the first mode, the driving voltage of the SoC is set to 1.5V and the frequency of the driving clock is set to 2.0 GHz. When the number of requests in the sync queue SQ is between 31 and 40, the QoS control module 138 selects a second mode as the DVFS level. In the second mode, the driving voltage of the SoC is set to 1.7V and the frequency of the driving clock is set to 2.5 GHz. When the number of requests in the sync queue SQ is more than 40, the QoS control module 138 selects a third mode as the DVFS level. In the third mode, the driving voltage of the SoC is set to 2.0V and the frequency of the driving clock is set to 3.0 GHz. The DVFS levels depend on the number of requests in the sync queue SQ and may further comprise a step lower or higher than the default mode and the first to third modes.

The higher a DVFS level, the higher an operation frequency and a driving voltage level of the SoC. Thus, power consumed to perform an operation requested by a user may quickly increase. However, since a computing speed of the SoC and an access speed to the storage device 170 rise, memory access requests accumulated in the sync queue SQ are rapidly processed. Thus, it is possible to provide a user with a fast response speed without an increase in power consumption of the mobile device 100.

Figure 10:
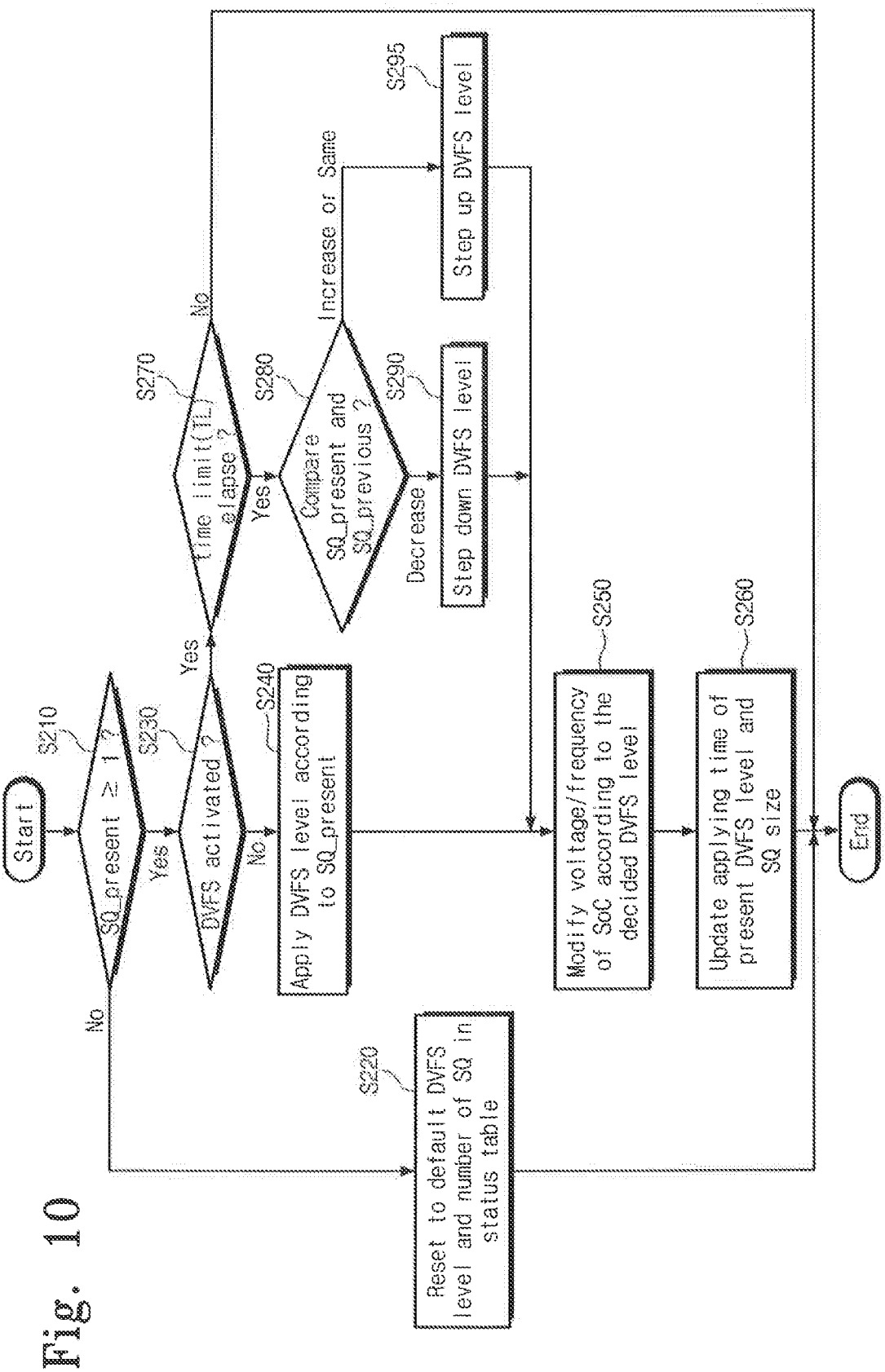
FIG. 10 is a flow chart illustrating a DVFS adjusting method according to an exemplary embodiment of the inventive concept.

FIG. 10 is a flow chart illustrating a DVFS adjusting method according to an exemplary embodiment of the inventive concept. In describing FIG. 10, component references may be made with reference to FIGS. 1 and 2. Referring to FIG. 10, there is described an exemplary embodiment of the inventive concept in which a DVFS mode is changed according to a variation in the number of requests accumulated in the sync queue 134. A DVFS control operation according to an exemplary embodiment of the inventive concept starts when the device driver 137 checks a buffer status of the input/output scheduler 135.

In step S210, the device driver 137 detects the size of requests SQ_present (hereinafter, also referred to as current sync queue size) included in the sync queue 134 and currently maintained in the input/output scheduler 135. When the current sync queue size SQ_present is less than 1 (No), the method proceeds to step S220. When the current sync queue size SQ_present is 1 or more (Yes), the method proceeds to step S230.

In step S220, the device driver 137 resets a current DVFS level in a status table configured for DVFS control to a default value and resets the current sync queue size SQ_present. The device driver 137 terminates a DVFS control operation based on the current sync queue size SQ_present. In FIG. 10, there are described a SQ detecting operation and a DVFS control operation according to the detection result. However, the SQ detecting operation may be performed periodically or within a particular time after a DVFS level is adjusted.

In step S230, the device driver 137 detects whether a DVFS control operation according to a previous sync queue size SQ_previous is activated. When the previous DVFS control operation is at an inactive state (No), the method proceeds to step S240. When the previous DVFS control operation is at an active state (Yes), the method proceeds to step S270. Since a DVFS level to be applied to a current DVFS control operation is determined according to whether a previous DVFS control operation is completed, whether the previous DVFS control operation is still activated may be checked.

In step S240, the device driver 137 selects and applies a DVFS level according to the current sync queue size SQ_present. For example, when the current sync queue size SQ_present is 25, a first mode of the DVFS level may be selected and applied on the basis of the table of FIG. 9. The current sync queue size SQ_present may correspond to the number of read or write requests accumulated in the sync queue 134.

In step S250, the device driver 137 performs a control operation for adjusting clock frequencies and driving voltages of all devices and the system interconnector 190 of the SoC according to the selected DVFS level. For example, the device driver 137 controls a performance controller 140 to generate a driving voltage of 1.5V corresponding to the first mode. The performance controller 140 may control a voltage regulator to change a voltage for driving the SoC to 1.5V. In addition, the device driver 137 controls the performance controller 140 to generate a clock frequency of 2.0 GHz corresponding to the first mode. The performance controller 140 may adjust a frequency of a driving clock to 2.0 GHz by controlling a frequency of a clock generating circuit such as a phase locked loop (PLL) included in the mobile device 100.

In step S260, the device driver 137 updates the status table with the current DVFS level and a time when the DVFS level is applied. Information on the current DVFS level and its applied point of time stored in the status table may be referred to in a following DVFS level control operation.

In operation S270, the device driver 137 detects whether an applying time of a DVFS level activated by a previous sync queue size SQ_previous exceeds a time limit TL. The time limit TL may be a time from when a previous DVFS level is activated to when it can be switched to a currently determined DVFS level. The time limit TL may be set to half a timeout, for example.

If the time limit TL of the previous sync queue size SQ_previous does not elapse (No), the method ends. The reason for this may be that the DVFS level does not have to be quickly changed when accumulated access requests are processed using the DVFS level based on the previous sync queue size SQ_previous. If the time limit TL of the previous sync queue size SQ_previous elapses (Yes), the method moves to step S280 for adjusting the DVFS level based on the current sync queue size SQ_present. The reason for this may be that the application time of the DVFS level based on the previous sync queue size SQ_previous is sufficient.

In step S280, the device driver 137 compares the current sync queue size SQ_present and the previous sync queue size SQ_previous. The device driver 137 may compare the current sync queue size SQ_present with the previous sync queue size SQ_previous based on a separately managed status table. If the current sync queue size SQ_present is less than the previous sync queue size SQ_previous, the method proceeds to step S290. If the current sync queue size SQ_present is more than the previous sync queue size SQ_previous or the same as the previous sync queue size SQ_previous, the method proceeds to step S295.

In step S290, the device driver 137 steps down the DVFS level activated by the previous sync queue size SQ_previous. The reason for this may be that the number of requests accumulated in the sync queue 134 decreased while processing at the DVFS level of the previous sync queue size SQ_previous. In step S295, the device driver 137 steps up the DVFS level activated by the previous sync queue size SQ_previous. The reason for this may be that a higher processing speed is required due to an increase in the number of access requests while processing under the DVFS level of the previous sync queue size SQ_previous.

There is described a method in which dynamic performance of the mobile device 100 is controlled by changing a DVFS level of the SoC according to the number of requests accumulated in the sync queue 134. When a processing speed of the SoC is adjusted according to the number of requests accumulated in the sync queue 134, the SoC may be set to an optimal performance at a point of time when access requests included in the sync queue 134 are actually processed. Thus, it is possible to optimize the quality of service QoS or performance a user feels.

Figure 11:
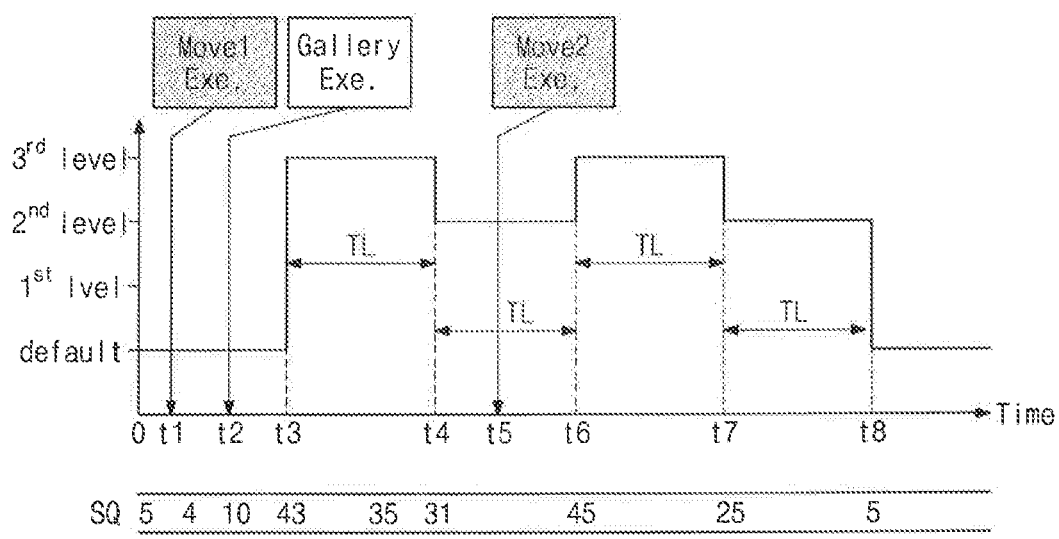
FIG. 11 is a timing diagram illustrating a variation in a sync queue according to a control method of FIG. 10, according to an exemplary embodiment of the inventive concept.

FIG. 11 is a timing diagram illustrating a variation in a sync queue according to a control method of FIG. 10, according to an exemplary embodiment of the inventive concept. In describing FIG. 11, component references may be made with reference to FIGS. 1 and 2. Referring to FIG. 11, a DVFS level of the SoC is adjusted according to the number of requests in a sync queue SQ not processed. Thus, the mobile device 100 is set to a system driving environment optimized to a scheduled process. It is assumed that at an initial time (0), the number of requests in the sync queue SQ is 5 and a DVFS level is a default mode. The default mode may be that of FIG. 9.

At t1, a user requests a playback of a moving picture file. At this time, an application program for a playback of the moving picture file is executed and generates a plurality of read and write requests to load the moving picture file. In this case, the number of requests in the sync queue SQ increases. However, the parameters of the default mode of the DVFS condition are enough to process a single task such as a playback of the moving picture file. Thus, the number of requests in the sync queue SQ does not increase sharply.

At t2, the user executes a gallery program. At this time, multi-processing of playing the moving picture back and loading image files is required. Thus, the number of urgent write or read requests for the multi-processing increases sharply. The parameters of the default mode may not be able to quickly process this increase in read or write requests. Thus, the number of requests in the sync queue SQ managed by the input/output scheduler 135 gradually increases.

At t3 when the number of requests in the sync queue SQ is 43, the device driver 137 sets the DVFS level to a third mode. The third mode may be that of FIG. 9. Then, an operation frequency of the SoC rises to 3.0 GHz. Here, the operation frequency of the SoC is a clock frequency of the CPU 110. However, the operation frequency may be an operation frequency of various devices included in the SoC. When the DVFS level is set to the third mode, an operation voltage of the SoC is set to 2.0V. As the DVFS level is set to the third mode, the number of requests in the sync queue SQ gradually decreases. As illustrated in FIG. 11, the number of requests in the sync queue SQ gradually decreases as follows: (43→35→31).

If a time limit TL elapses from t3, it is possible to detect a current sync queue size SQ_present and to change the DVFS level. Thus, at t4, the device driver 137 sets the DVFS level to a second mode based on the number of requests in the sync queue SQ managed by the input/output scheduler 135. The second mode may be that of FIG. 9. The reason for this may be that the number of requests in the sync queue SQ detected at t4 corresponds to the second mode of the DVFS level illustrated in FIG. 9. To apply the second mode of the DVFS level, the device driver 137 controls the performance controller 140 such that an operation frequency of the SoC 110 is changed to 2.5 GHz and a level of a driving voltage is changed to 1.7V.

It is assumed that at t5 the user plays another moving picture file back. Then, three tasks for a playback of a running moving picture file, an execution of a gallery file and a playback of an additional moving picture file are simultaneously performed. Thus, read and write requests for multi-tasking (e.g., three tasks) increase rapidly. An increase in the number of read and write requests causes the number of requests in the sync queue SQ to increase as well. However, t5 is a point of time before the time limit TL of the second mode of the DVFS level elapses. Thus, the device driver 137 may monitor the number of requests in the sync queue SQ until t6. The number of requests in the sync queue SQ reaches 45 at t6.

At t6, since the time limit TL of the second mode of the DVFS level from t4 elapses, it is possible to change the DVFS level to correspond to a current sync queue size SQ. Since the current sync queue size SQ corresponds to 45, the DVFS level is changed to the third mode under a control of the device driver 137. To apply the third mode of the DVFS level, under a control of the device driver 137, an operation frequency of the SoC is changed to 3.0 GHz and a level of a driving voltage is changed to 2.0V. As a processing speed of the SoC is improved, the number of requests in the sync queue SQ to be urgently processed decreases gradually. At t7, the number of requests in the sync queue SQ again decreases to 25.

At t7, since the current sync queue size SQ detected corresponds to 25, the DVFS level is switched to the second mode under a control of the device driver 137. At t8 when the time limit TL that began at t7 elapses, the device driver 137 sets the DVFS level to the first mode in which the current sync queue size SQ corresponds to 5.

There is described a method of adjusting a DVFS level of the SoC according to the number of requests in the sync queue SQ not processed. A performance of the SoC is varied according to the number of requests (e.g., a sync queue size) to be processed. Thus, an operation condition of the mobile device 100 is set according to a work amount of requests to be processed urgently. As an operation condition is dynamically set, a response time to a user request is minimized and performance a user feels is maximized.

Figures 12, 13:
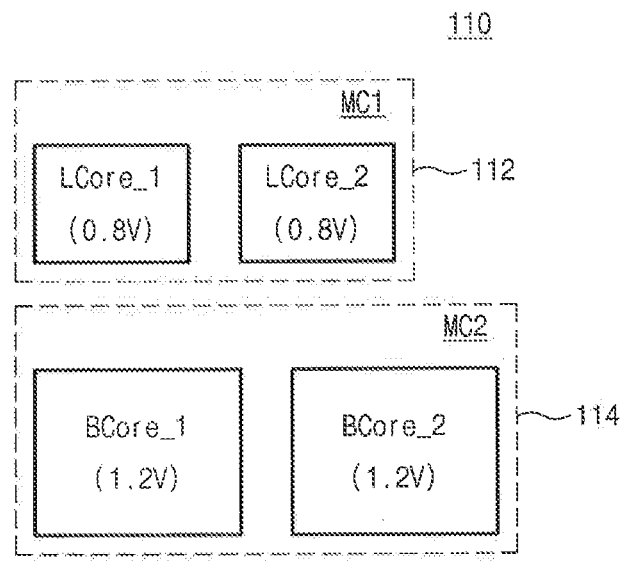
FIG. 12 is a block diagram illustrating an exemplary embodiment of the inventive concept.
FIG. 13 is a table showing a driving mode of a central processing unit (CPU) corresponding to the number of requests in a sync queue, according to an exemplary embodiment of the inventive concept.

FIG. 12 is a block diagram illustrating an exemplary embodiment of the inventive concept. Referring to FIG. 12, there is illustrated a CPU 110 including a heterogeneous multi-core. However, the CPU 110 may include a homogenous multi-core.

The CPU 110 may include two or more heterogeneous multi-cores. For example, the CPU 110 includes a first multi-core 112 and a second multi-core 114. According to an exemplary embodiment of the inventive concept, the mobile device 100 of FIG. 1 may select at least one of the first and second multi-cores 112 and 114 to handle a process accumulated in a sync queue SQ according to the number of requests in the sync queue SQ.

The first multi-core 112 includes cores LCore_1 and LCore_2 with a relatively low processing speed and high power efficiency. The cores LCore_1 and LCore_2 may operate independently. The cores LCore_1 and LCore_2 may operate using a relatively low driving frequency, respectively.

The second multi-core 114 includes cores BCore_1 and BCore_2 with a relatively high processing speed and low power efficiency (or, large power consumption). The cores BCore_1 and BCore_2 may operate independently. The cores BCore_1 and BCore_2 may operate using a relatively high driving frequency, respectively.

The performance controller 140 (refer to FIG. 1) according to an exemplary embodiment of the inventive concept may select cores of the CPU 110 to be activated according to a control of the device driver 137 (refer to FIG. 1). For example, the number of cores to be activated may be changed according to the number of requests in the sync queue SQ detected. When the number of requests in the sync queue SQ is relatively small, at least one of the cores LCore_1 and LCore_2 of the first multi-core 112 is activated. When the number of requests in the sync queue SQ is more than a reference value, at least one of the cores BCore_1 and BCore_2 of the second multi-core 114 is activated. If the number of requests in the sync queue SQ increases sharply, both of the cores LCore_1 and LCore_2 of the first multi-core 112 and the cores BCore_1 and BCore_2 of the second multi-core 114 may be activated.

However, a method of selectively activating cores according to the number of requests in the sync queue SQ is not limited to the above description. For example, the first multi-core 112 may be only activated when the number of requests in the sync queue SQ is less than a reference value. When the number of requests in the sync queue SQ is more than the reference value, the second multi-core 114 may be only activated for rapid processing. Alternatively, the cores LCore_1 and BCore_1 may be only activated when the number of requests in the sync queue SQ is less than the reference value. When the number of requests in the sync queue SQ is more than the reference value, the cores LCore_2, and BCore_2 may be additionally activated for rapid processing.

FIG. 13 is a table showing a driving mode of the CPU 110 of FIG. 12 corresponding to the number of requests in a sync queue SQ, according to an exemplary embodiment of the inventive concept. Referring to FIG. 13, a driving method of multi-cores of the CPU 110 may be divided according to the number of requests in the sync queue SQ. Here, a heterogeneous multi-core control method is described as a control mode of the CPU 110. However, the inventive concept is not limited thereto.

It is assumed that a CPU mode managed by the device driver 137 of FIG. 1 is divided into four modes. However, it is understood that the CPU mode may be divided into two modes, three modes, or five or more modes.

When the number of requests in the sync queue SQ is between 1 and 5, the device driver 137 sets the CPU 110 to a little mode. During the little mode, the device driver 137 activates the cores LCore_1 and LCore_2 of the first multi-core 112. When the number of requests in the sync queue SQ is between 6 and 15, the device driver 137 sets the CPU 110 to a first big mode. During the first big mode, the device driver 137 activates one (e.g., BCore_1) of the cores BCore_1 and BCore_2 of the second multi-core 114.

When the number of requests in the sync queue SQ is between 16 and 30, the device driver 137 sets the CPU 110 to a second big mode. During the second big mode, the device driver 137 activates the cores BCore_1 and BCore_2 of the second multi-core 114. When the number of requests in the sync queue SQ is more than 30, the device driver 137 sets the CPU 110 to a third big mode. During the third big mode, the device driver 137 activates both of the cores LCore_1 and LCore_2 of the first multi-core 112 and the cores BCore_1 and BCore_2 of the second multi-core 114.

The above-described method of selecting cores according to CPU modes is exemplary. Various modifications or changes to the number and unit of cores selected according to the number of requests in the sync queue SQ may be made. For example, a core unit switched according to the number of requests in the sync queue SQ may be selected by a multi-core unit. In other words, the second multi-core 114 may be selected activated according to the number of requests in the sync queue SQ under a condition where the first multi-core 112 is always activated.

Figure 14:
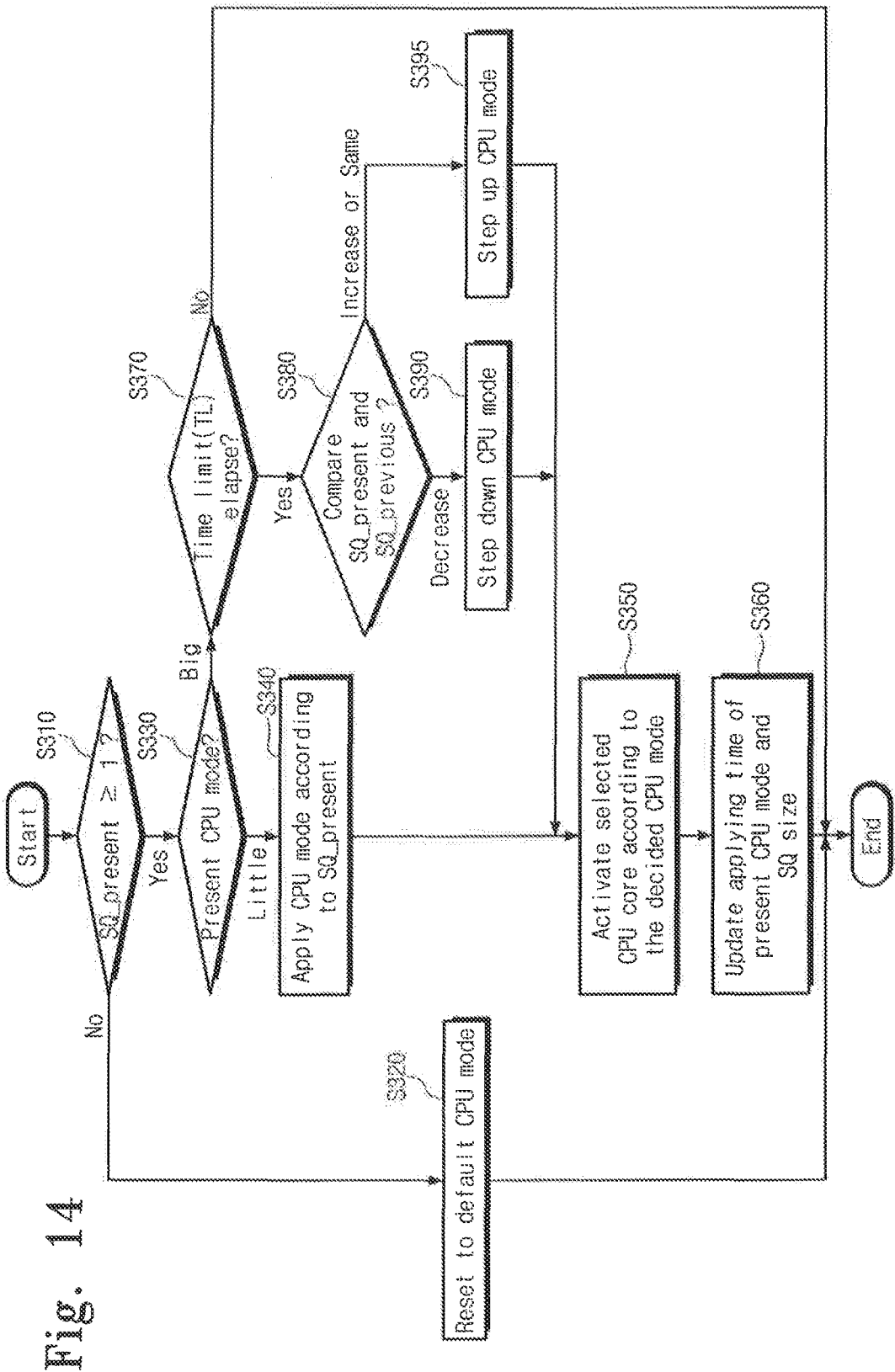
FIG. 14 is a flow chart illustrating a CPU mode changing method according to an exemplary embodiment of the inventive concept.

FIG. 14 is a flow chart illustrating a CPU mode changing method according to an exemplary embodiment of the inventive concept. In describing FIG. 14, component references may be made with reference to FIGS. 1, 2 and 12. Referring to FIG. 14, there is described an exemplary embodiment of the inventive concept in which a driving mode of the CPU 110 is changed according to a variation in the number of requests in the sync queue 134. A CPU mode control operation according to an exemplary embodiment of the inventive concept starts when the device driver 137 or the QoS control module 138 of the device driver 137 checks a status of the input/output scheduler 135.

In step S310, the device driver 137 detects a current sync queue size SQ_present managed by the input/output scheduler 135. When the current sync queue size SQ_present is 0 (No), the method proceeds to step S320. When the current sync queue size SQ_present is 1 or more (Yes), the method proceeds to step S330.

In step S320, the device driver 137 resets a current CPU mode in a status table configured for a control of a CPU mode to a little mode and resets the current sync queue size SQ_present. The device driver 137 terminates a CPU mode setting operation based on the current sync queue size SQ_present. In FIG. 14, there is described a CPU mode setting operation for the current sync queue size SQ_present. However, the SQ detecting operation may be performed periodically or within a particular time after a CPU mode is adjusted.

In step S330, the device driver 137 detects whether one of the big modes selected according to a previous SQ detecting operation is activated under a condition where at least one request to be processed is included in the sync queue 134. When the previous CPU mode is a little mode (Little), the method proceeds to step S340. When the previous CPU mode is one of the big modes (Big), the method proceeds to step S370. Since a current CPU mode is determined according to a previous CPU mode, the previous CPU mode may be checked.

In step S340, the device driver 137 selects and applies a CPU mode according to the current sync queue size SQ_present. For example, when the current sync queue size SQ_present detected is 25, a second big mode may be selected and applied on the basis of the table of FIG. 13.

In step S350, the device driver 137 selectively activates cores in the CPU 110 included in the SoC according to a selected CPU mode. For example, when the current sync queue size SQ_present corresponds to 25, the device driver 137 may activate cores corresponding to the second big mode. In other words, the device driver 137 may activate the cores BCore_1 and BCore_2 included in the second multi-core 114.

In step S360, the device driver 137 updates the status table with the current CPU mode and a time when the current CPU mode is applied. Information on the current CPU mode and its applied point of time stored in the status table may be referred to in a following CPU mode control operation.

In operation S370, the device driver 137 detects whether an applying time of a CPU mode activated by a previous sync queue size SQ_previous exceeds a time limit TL. The time limit TL may be a maximum application time of the previous CPU mode. In addition, the time limit TL may be a time from when the previous CPU mode is activated to when it can be switched to a currently determined CPU mode. The CPU mode may not be changed until the time limit TL elapses.

If the time limit TL of the previous sync queue size SQ_previous does not elapse (No), the method ends. The reason for this may be that the CPU mode does not have to be changed hastily to the current sync queue size SQ_present since access requests accumulated are processed based on the previous sync queue size SQ_previous. If the time limit TL of the previous sync queue size SQ_previous elapses (Yes), the method moves to step S380 for adjusting the CPU mode based on the current sync queue size SQ_present. The reason for this may be that the application time of the CPU mode corresponding to the previous sync queue size SQ_previous is sufficient.

In step S380, the device driver 137 compares the current sync queue size SQ_present and the previous sync queue size SQ_previous. The device driver 137 detects the previous sync queue size SQ_previous based on a separately managed status table and compares the current sync queue size SQ_present with the previous sync queue size SQ_previous detected. If the current sync queue size SQ_present is less than the previous sync queue size SQ_previous, the method proceeds to step S390. If the current sync queue size SQ_present is more than the previous sync queue size SQ_previous or the same as the previous sync queue size SQ_previous, the method proceeds to step S395.

In step S390, the device driver 137 steps down the CPU mode set according to the previous sync queue size SQ_previous. The reason for this may be that the number of requests accumulated in the sync queue 134 decreased while processing the CPU mode of the previous sync queue size SQ_previous. In step S395, the device driver 137 steps up the CPU mode set according to the previous sync queue size SQ_previous. The reason for this may be that a higher processing speed is required due to an increase in the number of requests accumulated in the sync queue 134 while processing at the CPU mode set by the previous sync queue size SQ_previous.

There is described a method in which a performance of the mobile device 100 is controlled by changing a CPU mode of the SoC according to the number of requests accumulated in the sync queue 134. When a processing speed of the SoC is adjusted according to the number of requests accumulated in the sync queue 134, the SoC may be set to an optimal performance at a point of time when access requests included in the sync queue 134 are actually processed. Thus, it is possible to optimize the quality of service or performance a user feels.

Above, exemplary embodiments of the inventive concept were described in which a CPU mode and a DVFS level are applied independently. However, the inventive concept is not limited thereto. For example, a CPU mode and a DVFS level may be combined. In other words, the number or types of cores of the CPU 110 activated according to a driving frequency may be varied.

FIG. 15 is a table showing system performance levels corresponding to the number of requests in a sync queue, according to an exemplary embodiment of the inventive concept. In describing FIG. 15, component references may be made with reference to FIGS. 1, 2 and 12. Referring to FIG. 15, there are illustrated system performance levels providing an optimal performance condition according to the number of requests in a sync queue. Here, the system performance level may correspond to an operation mode where a QoS level, a DVFS level and CPU modes are combined. In other words, at least one of a QoS level, a DVFS level and CPU modes may be activated to provide an optimal performance according to the particular number of requests in a sync queue.

It is assumed that the number of system performance levels managed by the device driver 137 is 6. However, the inventive concept is not limited thereto. For example, the number of CPU modes may be more than 2 and less than 5 or be more than 7.

When the number of requests in a sync queue SQ is between 1 and 5, the device driver 137 sets a system operation performance to a first performance level level_1. The first performance level level_1 is a default level of the system operation performance. However, a combination of a QoS level, a DVFS level and CPU modes corresponding to a performance lower than that of the first performance level level_1 may be set to the default level. In the first performance level level_1, a CPU mode is set to a little mode where cores LCore_1 and LCore_2 are only activated. In the first performance level level_1, a DVFS level is set to a first level $1^{st}$ DVFS level of little core, and a QoS level is set to a first step of little core.

When the number of requests in the sync queue SQ is between 6 and 10, the device driver 137 sets the system operation performance to a second performance level level_2. In the second performance level level_2, a CPU mode is set to the little mode where the cores LCore_1 and LCore_2 are only activated. In the second performance level level_2, a DVFS level is set to a second level $2^{nd}$ DVFS level of little core, and a QoS level is set to a second step of little core.

When the number of requests in the sync queue SQ is between 11 and 30, the device driver 137 sets the system operation performance to a third performance level level_3. In the third performance level level_3, a CPU mode is set to the little mode where the cores LCore_1 and LCore_2 are only activated. In the third performance level level_3, a DVFS level is set to a maximal level Max DVFS level of little core, and a QoS level is set to a maximal step Max QoS step of little core.

When the number of requests in the sync queue SQ is between 31 and 60, the device driver 137 sets the system operation performance to a fourth performance level level_4. In the fourth performance level level_4, a CPU mode is set to a big mode where cores BCore_1 and BCore_2 are activated. In the fourth performance level level_4, a DVFS level is set to a first level $1^{st}$ DVFS level of big core, and a QoS level is set to a first step of big core.

When the number of requests in the sync queue SQ is between 61 and 100, the device driver 137 sets the system operation performance to a fifth performance level level_5. In the fifth performance level level_5, a CPU mode is set to the big mode where the cores BCore_1 and BCore_2 are activated. In the fifth performance level level_5, a DVFS level is set to a second level $2^{nd}$ DVFS level of big core, and a QoS level is set to a second step of big core.

When the number of requests in the sync queue SQ is more than 100, the device driver 137 sets the system operation performance to a sixth performance level level_6. In the sixth performance level level_6, a CPU mode is set to the big mode where the cores LCore_1, LCore_2, BCore_1 and BCore_2 are activated. In the sixth performance level level_6, a DVFS level is set to a maximal level Max DVFS level of big core, and a QoS level is set to a maximal step Max QoS step of big core.

A system performance level for implementing an optimal performance according to the number of requests in a sync queue SQ is described with reference to FIG. 15. In FIG. 15, the system performance level is implemented such that each of a QoS level, a DVFS level and CPU modes is varied. However, the inventive concept is not limited thereto. In particular, the number of requests in a sync queue SQ, one of a QoS level, a DVFS level and CPU modes or a combination of two modes thereof may be activated.

Figure 16:
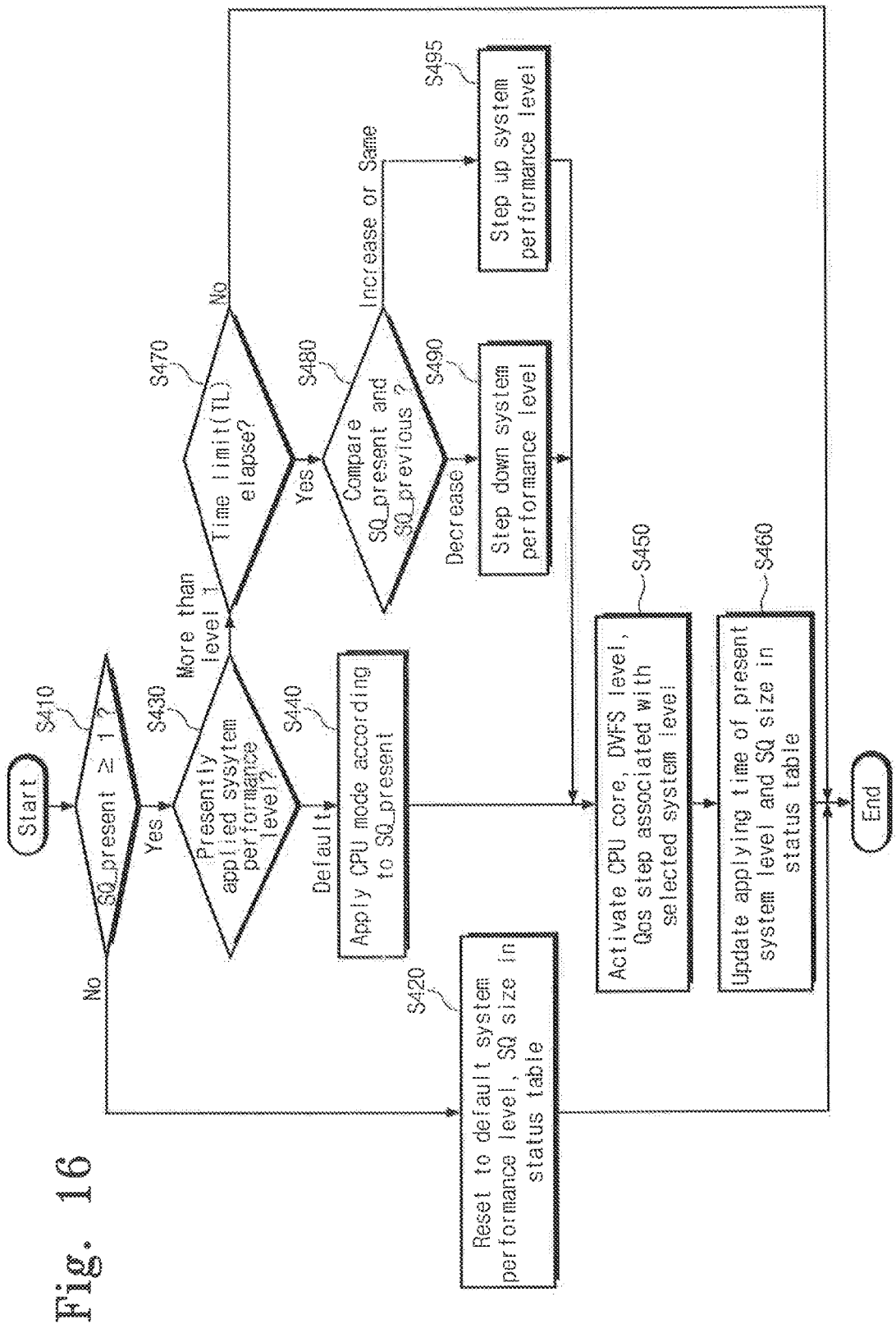
FIG. 16 is a flow chart illustrating a system performance level changing method according to an exemplary embodiment of the inventive concept.

FIG. 16 is a flow chart illustrating a system performance level changing method according to an exemplary embodiment of the inventive concept. In describing FIG. 16, component references may be made with reference to FIGS. 1, 2 and 12. Referring to FIG. 16, there is described an exemplary embodiment of the inventive concept in which there is changed a system operation mode where a QoS level, a DVFS level and CPU modes are combined according to the number of requests in the sync queue 134. A system performance level control operation according to an exemplary embodiment of the inventive concept starts when the device driver 137 or the QoS control module 138 checks a status of the input/output scheduler 135.

In step S410, the device driver 137 detects a current sync queue size SQ_present managed by the input/output scheduler 135. When the current sync queue size SQ_present is 0 (No), the method proceeds to step S420. When the current sync queue size SQ_present is 1 or more (Yes), the method proceeds to step S430.

In step S320, the device driver 137 resets a system performance level and the number of requests in the sync queue 134 in a status table. The device driver 137 terminates a system performance level setting operation based on the current sync queue size SQ_present. In FIG. 16, there is described a cycle of a system performance level setting operation. However, the SQ detecting operation may be triggered periodically or within a time after a system performance level is sharply lowered.

In step S430, the device driver 137 detects a system performance level selected according to a previous sync queue size SQ_previous. When a previous system performance level is set to a default mode (e.g., a first performance level), the method proceeds to step S440. When a previous system performance level is higher than a second performance level level_2, the method proceeds to step S470.

In step S440, the device driver 137 applies a system performance level according to the current sync queue size SQ_present regardless of a previously selected system performance level. For example, when the current sync queue size SQ_present detected is 25, a third performance level level_3 may be selected and applied on the basis of the table of FIG. 15.

In step S450, the device driver 137 activates at least one of a QoS level, a DVFS level and a CPU mode of the SoC according to a selected system performance mode. For example, the device driver 137 may apply a system performance level corresponding to the third performance level level_3 when the current sync queue size SQ_present is 25. In other words, the device driver 137 activates cores LCore_1 and LCore_2 included in the first multi-core 112. The device driver 137 sets a DVFS level to a maximal level Max DVFS level of little core and a QoS level to a maximal step Max QoS step of little core.

In step S460, the device driver 137 updates the status table with the current system performance mode and a time when the current system performance mode is applied. Information on the current system performance mode and its applied point of time stored in the status table may be referred to in a following system performance mode control operation.

In operation S470, the device driver 137 detects whether an applying time of a system performance mode activated by a previous sync queue size SQ_previous exceeds a time limit TL. The time limit TL may be a minimal time the previous system performance mode is maintained. Thus, the time limit TL may be a time from when the previous system performance mode is activated to when it can be switched to a currently determined system performance mode. The system performance mode may not be changed until the time limit TL elapses.

If the time limit TL of the previous sync queue size SQ_previous does not elapse (No), the method ends. The reason for this may be that a system performance mode does not have to be quickly changed when access requests accumulated in the sync queue 134 are processed based on the previous sync queue size SQ_previous. If the time limit TL of the previous sync queue size SQ_previous elapses (Yes), the method moves to step S480 for activating a system performance mode based on the current sync queue size SQ_present. The reason for this may be that the application time of the system performance mode corresponding to the previous sync queue size SQ_previous is sufficient.

In step S480, the device driver 137 compares the current sync queue size SQ_present and the previous sync queue size SQ_previous. The device driver 137 detects the previous sync queue size SQ_previous based on a separately managed status table and compares the current sync queue size SQ_present with the previous sync queue size SQ_previous detected. If the current sync queue size SQ_present is less than the previous sync queue size SQ_previous, the method proceeds to step S490. If the current sync queue size SQ_present is more than the previous sync queue size SQ_previous or the same as the previous sync queue size SQ_previous, the method proceeds to step S495.

In step S490, the device driver 137 steps down the system performance mode set according to the previous sync queue size SQ_previous. The reason for this may be that the number of requests SQ accumulated in the sync queue 134 decreased while processing at the system performance mode activated by the previous sync queue size SQ_previous. In step S495, the device driver 137 steps up the system performance mode set according to the previous sync queue size SQ_previous. The reason for this may be that a higher processing speed is required due to no variation or an increase in the number of requests accumulated in the sync queue 134 while processing at the system performance mode set by the previous sync queue size SQ_previous.

There is described a method in which a performance of the mobile device 100 is controlled by changing a system performance mode of the SoC according to the number of requests in the sync queue 134. When a processing speed of the SoC is adjusted according to the number of requests in the sync queue 134, the SoC may be set to an optimal performance at a point of time when access requests included in the sync queue 134 are actually processed. Thus, it is possible to optimize the quality of service or performance a user feels.

Figure 17:
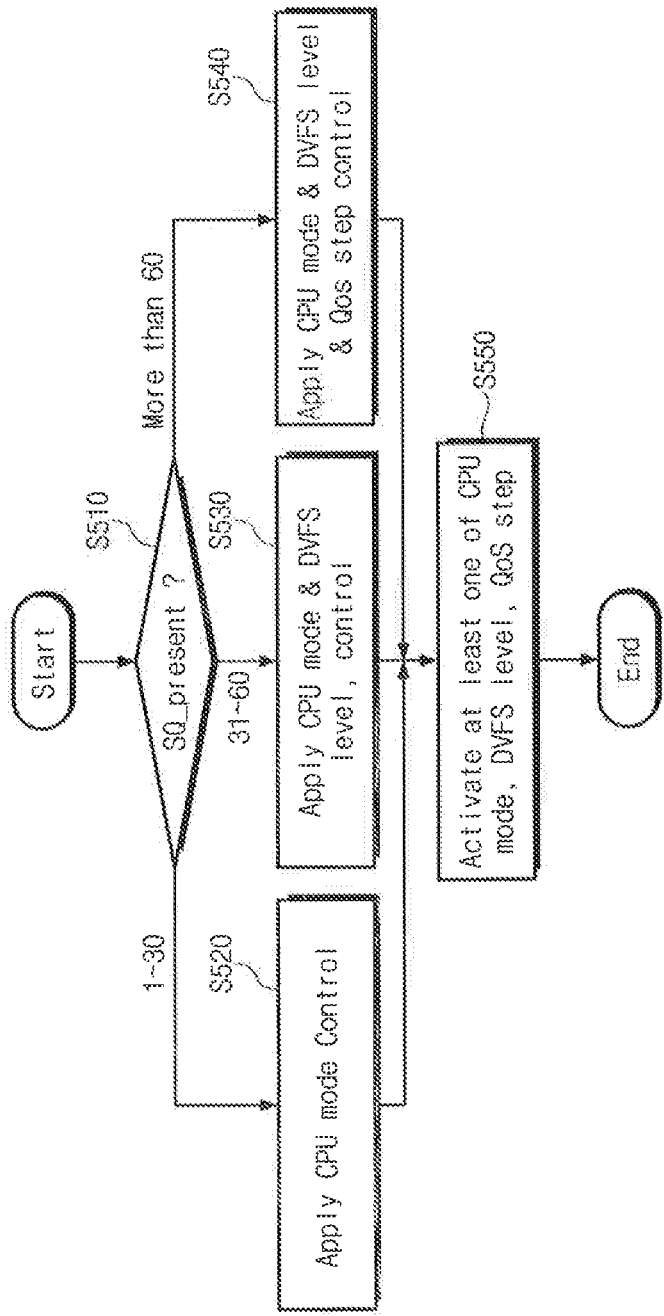
FIG. 17 is a flow chart illustrating a system performance mode control method according to an exemplary embodiment of the inventive concept.

FIG. 17 is a flow chart illustrating a system performance mode control method according to an exemplary embodiment of the inventive concept. In describing FIG. 17, component references may be made with reference to FIGS. 1, 2 and 12. Referring to FIG. 17, there is exemplarily described a method of selecting an optimal case of system performance levels where a QoS level, a DVFS level and CPU mode(s) are combined according to a currently detected sync queue size SQ_present.

In step S510, the device driver 137 detects a current sync queue size SQ_present managed by the input/output scheduler 135. When the current sync queue size SQ_present is between 1 and 30, the method proceeds to step S520. When the current sync queue size SQ_present is between 31 and 60, the method proceeds to step S530. When the current sync queue size SQ_present is more than 60, the method proceeds to step S540.

In step S520, the device driver 137 applies a CPU mode as a method of improving a processing performance on requests currently accumulated in the sync queue 134. In other words, the device driver 137 may select a driving level of a homogeneous or heterogeneous multi-core according to the current sync queue size SQ_present. For example, when the number of requests in the sync queue 134 is between 1 and 5, the device driver 127 may set the CPU 110 to be driven by a little mode where LCore_1 and LCore_2 in the first multi-core 112 are only activated. On the other hand, when the number of requests in the sync queue 134 is between 20 and 30, the device driver 127 may set the CPU 110 to be driven by a big mode where BCore_1 and BCore_2 in the second mufti-core 114 are activated. The above-described method of selecting homogeneous or heterogeneous multi-cores according to CPU modes is exemplary. Various modifications and changes to the number and unit of cores selected according to the current sync queue size SQ_present detected may be made.

In step S530, the device driver 137 applies both a CPU mode and adjusting of a DVFS level as a method of improving a processing performance on requests currently accumulated in the sync queue 134. In other words, the device driver 137 may select a driving level of a homogeneous or heterogeneous multi-core according to the current sync queue size SQ_present and selects a DVFS level applied to selected cores. For example, when the number of requests in the sync queue 134 is between 31 and 40, the device driver 127 may set the CPU 110 to be driven by a little mode. And the device driver 137 may apply a second DVFS level $2^{nd}$ DVFS level (refer to FIG. 9) with respect to the first multi-core 112 selected at the little mode. It is possible to optimize a system performance on the current sync queue size SQ_present detected by adjusting the CPU mode and the DVFS level.

In step S540, the device driver 137 combines a CPU mode, a DVFS level and a QoS step as a method of improving a processing performance on requests currently accumulated in the sync queue 134. In other words, the device driver 137 may adjust the above-described system performance level according to the current sync queue size SQ_present. The device driver 137 may adjust a system performance level as explained with reference to FIGS. 15 and 16, and a description thereof is thus omitted.

In step S550, the device driver 137 sets the SoC or the storage device 170 according to the selected system performance improving method. The device driver 137 activates at least one of a QoS level, a DVFS level and a CPU mode according to the selected system performance improving method and adjusts the appropriate hardware.

Figure 18:
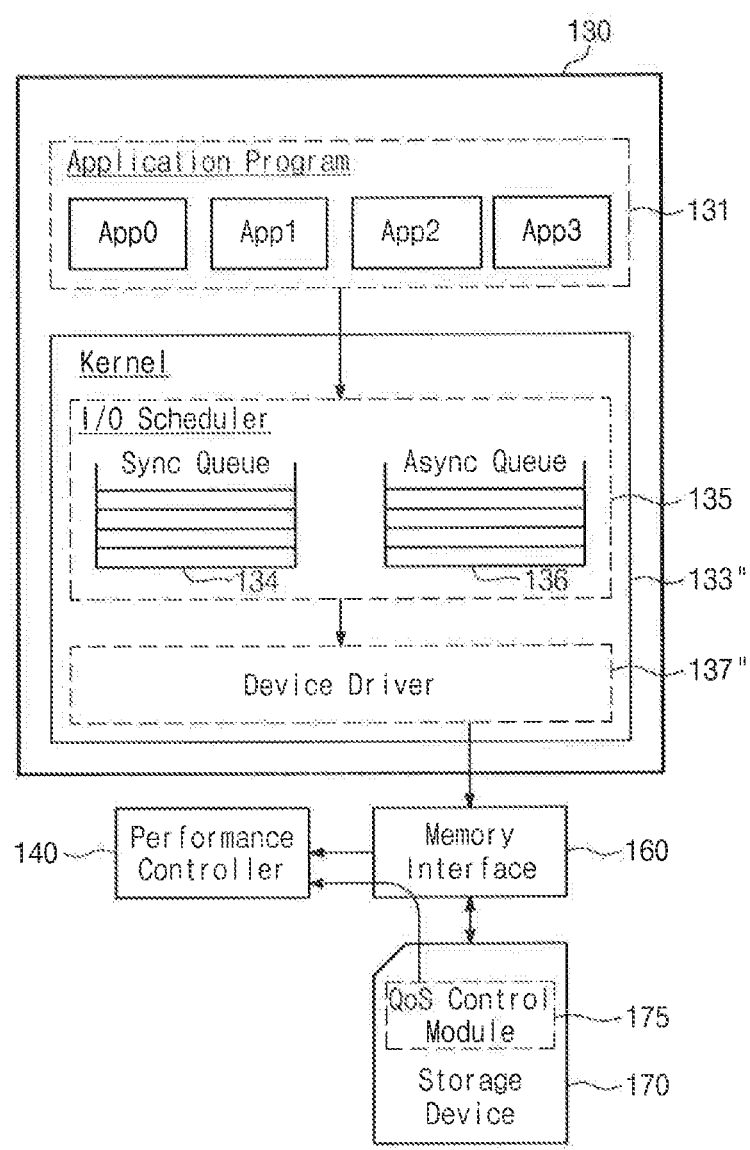
FIG. 18 is a block diagram illustrating a mobile device according to an exemplary embodiment of the inventive concept.

FIG. 18 is a block diagram illustrating a mobile device according to an exemplary embodiment of the inventive concept. Referring to FIG. 18, a software hierarchical structure of the mobile device 100 of FIG. 1 loaded onto a working memory 130 and driven by the CPU 110 of FIG. 1 is divided into an application program 131 and a kernel 133". Here, the application program 131, an input/output scheduler 135, a performance controller 140, a memory interface 160, etc. are substantially the same as those described with reference to FIG. 2, and a description thereof is thus omitted.

The kernel 133" is divided into the input/output scheduler 135 and a device driver 137". The device driver 137" may not contribute to a control operation for improving a system performance. Instead, a storage device 170 includes a QoS control module 175. The QoS control module 175 may be a partial module of firmware of a memory controller included in the storage device 175.

The QoS control module 175 determines a method of improving a performance of the SoC of FIG. 1 or a performance of the storage device 170 based on the number of requests accumulated in a sync queue 134 provided by the device driver 137". The QoS control module 175 controls the performance of the SoC and the storage device 170 according to the determined performance improving method. In other words, the QoS control module 175 provides the performance controller 140 with the determined performance improving method. For this, the memory interface 160 transfers the number of requests in the sync queue 134 of the SoC to the storage device 170. Or, the memory interface 160 transfers the determined performance improving method to the performance controller 140. The memory interface 160 may include an interface suitable for exchanging such transactions.

Figure 19:
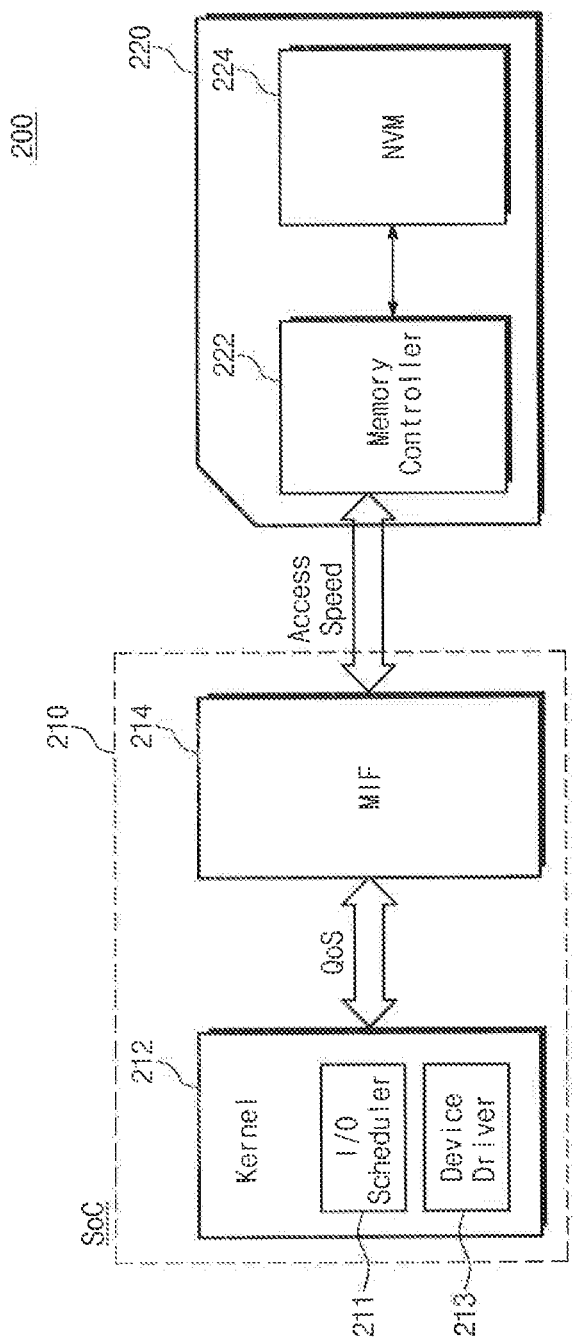
FIG. 19 is a block diagram illustrating a mobile device according to an exemplary embodiment of the inventive concept.

FIG. 19 is a block diagram illustrating a mobile device according to an exemplary embodiment of the inventive concept. Referring to FIG. 19, a mobile device 200 includes a SoC 210 and a memory card 220. The memory card 220 includes a memory controller 222 and a nonvolatile memory device 224.

A software hierarchical structure of the SoC 210 includes a kernel 212. The kernel 212 includes an input/output scheduler 211 and a device driver 213. Here, the device driver 213 continues to monitor the number of requests in a sync queue SQ managed by the input/output scheduler 211. The device driver 213 provides a quality of service control signal QoS to a memory interface 214 according to the number of requests in the sync queue SQ. The memory interface 214 determines an access speed to the memory card 220 in response to the quality of service control signal QoS. A command set or a control signal set capable of controlling an access speed may be provided between the memory interface 214 and the memory controller 222.

If provided with a command or a control signal at an access speed from the memory interface 214, the memory controller 222 sets a program or read speed of the nonvolatile memory device 224. For example, for a high-speed program operation, the memory controller 222 controls the nonvolatile memory device 224 according to access speed information such that data is programmed in a single level cell (SLC) area of the nonvolatile memory device 224. Or, for a high-speed program operation, the memory controller 222 controls the nonvolatile memory device 224 according to access speed information such that data is programmed in an least significant bit (LSB) page of multi-level memory cells of the nonvolatile memory device 224. A method of adjusting a read or program method according to access speed information is not limited to this disclosure. An internal operation speed of the memory card 220 may be improved with various methods.

The nonvolatile memory device 224 is used as a storage medium of the memory card 220. For example, the nonvolatile memory device 224 may be implemented by a NAND flash memory having a mass storage capacity. Or, the nonvolatile memory device 224 may be implemented by a next-generation nonvolatile memory (e.g., PRAM, MRAM, ReRAM, FRAM, etc.) or a NOR flash memory. In particular, the nonvolatile memory device 224 may adjust a bias level such as a direct current (DC) voltage in response to a command or a control signal from the memory controller 222.

There is described an exemplary embodiment of the inventive concept where a program or read speed of the nonvolatile memory device 224 is varied according to the number of requests in the sync queue SQ. However, various modifications and changes to an access speed changing method of the memory controller 222 may be made.

Figure 20:
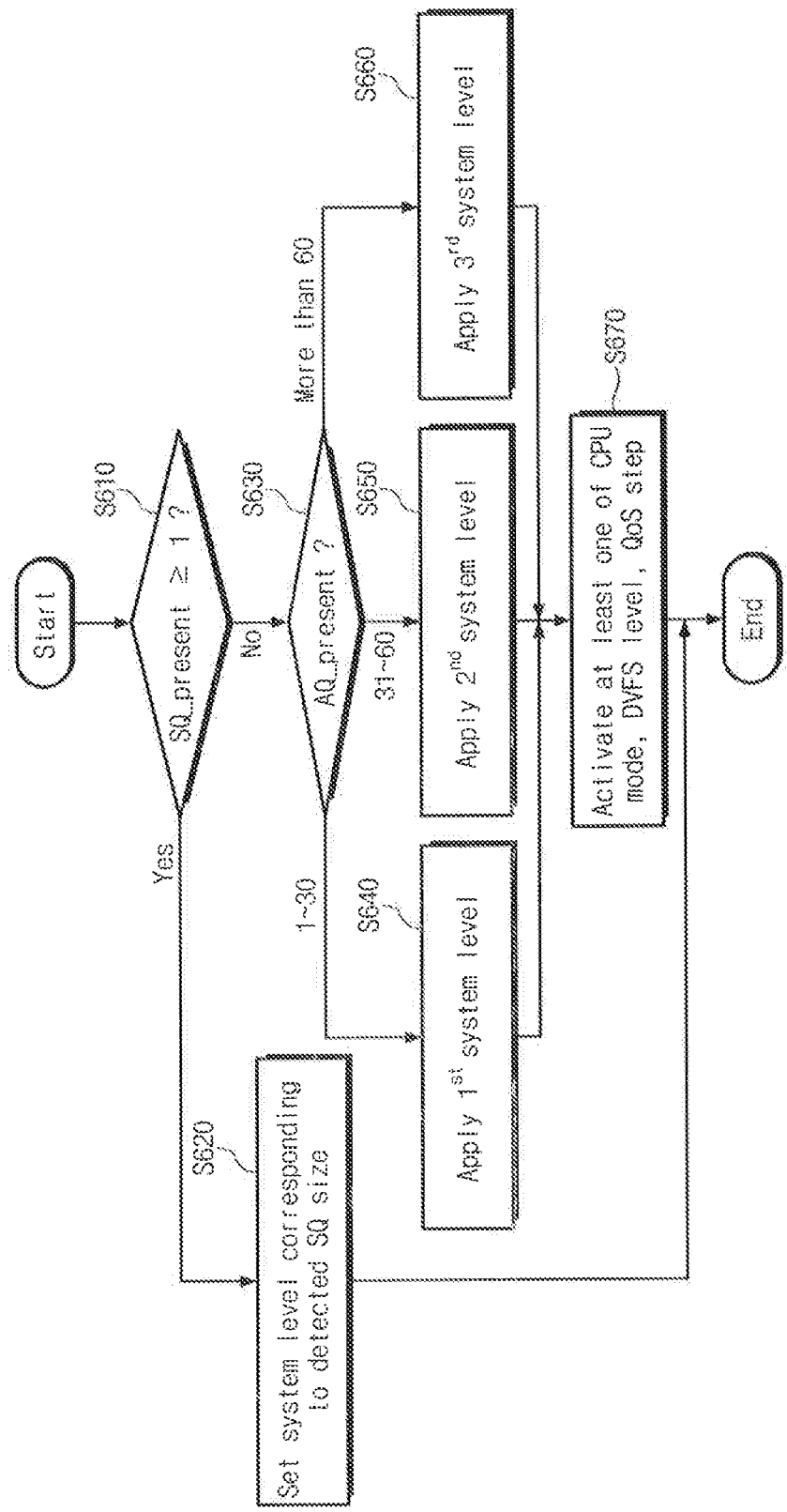
FIG. 20 is a flow chart illustrating a performance control method of a mobile device according to an exemplary embodiment of the inventive concept.

FIG. 20 is a flow chart illustrating a performance control method of a mobile device according to an exemplary embodiment of the inventive concept. Referring to FIG. 20, there may be described a method of adjusting a performance mode of a SoC according to the number of requests in a sync queue SQ and the number of requests in an async queue AQ. The requests in the async queue AQ can exist even if the requests in the sync queue SQ are completed or no more exist. In this case, the requests remaining in the async queue AQ should be completed to change a power mode of a mobile device. By completing the requests remaining in the async queue AQ, the mobile device can change the power mode to a low power mode. Thus, energy efficiency and power saving of the mobile device can be improved.

Power consumption may be reduced by adjusting a system performance mode although the sync queue SQ does not include a request and the async queue includes AQ a request not necessitating real-time processing.

In operation S610, the device driver 137 of FIG. 2 detects a current sync queue size SQ_present managed by the input/output scheduler 135 of FIG. 2. If the current sync queue size SQ_present is more than or equal to 1 (Yes), the method proceeds to step S620. If the current sync queue size SQ_present is 0 (No), the method proceeds to step S630.

In step S620, the device driver 137 performs a performance improving operation where at least one of methods of adjusting a CPU mode, a QoS step and a DVFS level is applied. This operation may correspond to above-described exemplary embodiments of the inventive concept.

In step S630, the device driver 137 detects a current async queue size AQ_present managed by the input/output scheduler 135. When the current async queue size AQ_present is between 1 and 30, the method proceeds to step S640. When the current async queue size AQ_present is between 31 and 60, the method proceeds to step S650. When the current async queue size AQ_present is more than 60, the method proceeds to step S660.

In step S640, the device driver 137 selects a first system level as a method of improving a processing performance on requests accumulated in the async queue AQ. In step S650, the device driver 137 selects a second system level as a method of improving a processing performance on requests accumulated in the async queue AQ. In step S660, the device driver 137 selects a third system level as a method of improving a processing performance on requests accumulated in the async queue AQ. Here, it is understood that as a performance mode, the first to third system levels are implemented by changing at least one of a CPU mode, a QoS step, and DVFS levels.

In step S670, the device driver 137 sets a SoC or the storage device 170 of FIG. 2 according to a selected system performance improving method. The device driver 137 activates at least one of a QoS level, a DVFS level and a CPU mode according to the selected system performance improving method and adjusts appropriate hardware.

Figure 21:
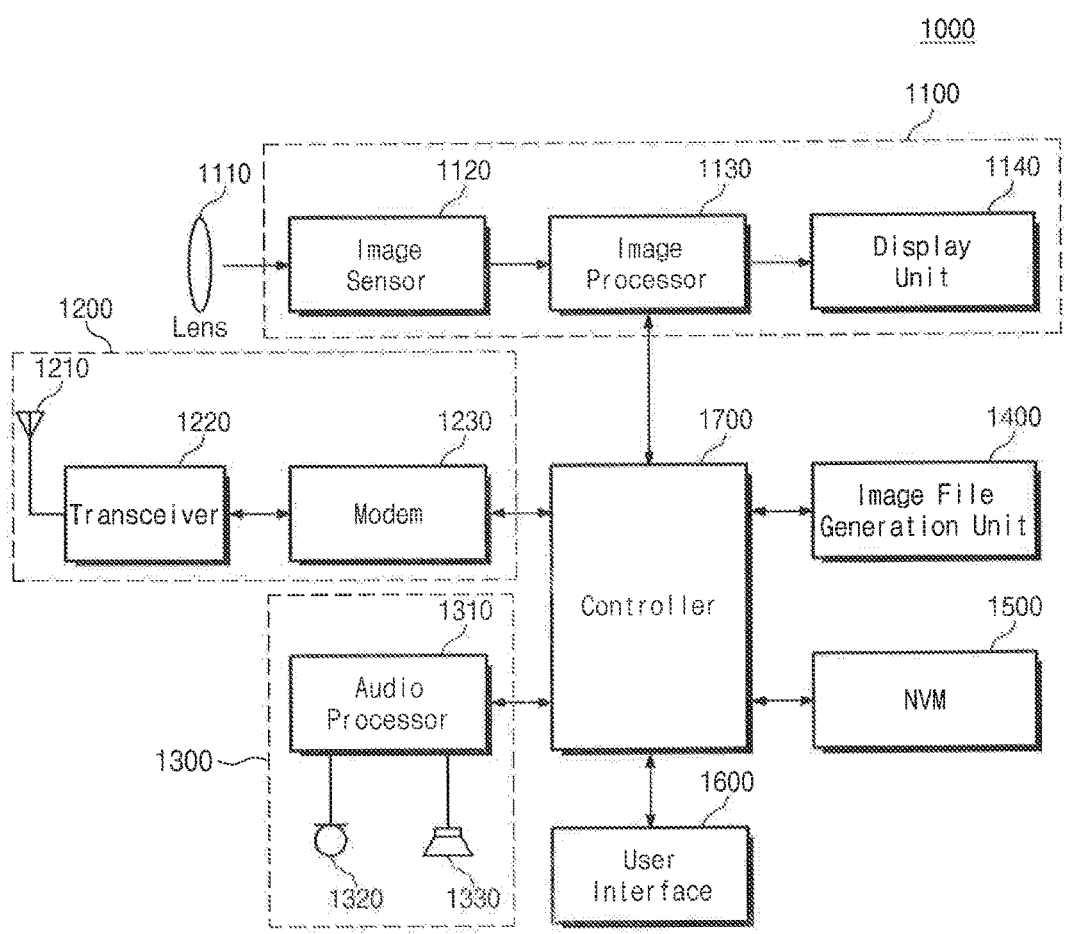
FIG. 21 is a block diagram illustrating a handheld terminal according to an exemplary embodiment of the inventive concept

FIG. 21 is a block diagram illustrating a handheld terminal according to an exemplary embodiment of the inventive concept. Referring to FIG. 21, a handheld terminal 1000 according to an exemplary embodiment of the inventive concept includes an image processing unit 1100, a wireless transceiver unit 1200, an audio processing unit 1300, an image file generation unit 1400, a nonvolatile memory device 1500, a user interface 1600, and a controller 1700.

The image processing unit 1100 includes a lens 1110, an image sensor 1120, an image processor 1130, and a display unit 1140. The wireless transceiver unit 1200 includes an antenna 1210, a transceiver 1220, and a modem 1230. The audio processing unit 1300 includes an audio processor 1310, a microphone 1320, and a speaker 1330.

Here, the nonvolatile memory device 1500 may be a memory card (e.g., MMC, eMMC, SD, micro SD, etc.) according to an exemplary embodiment of the inventive concept. The controller 1700 may be a SoC configured to drive an application program, an operating system, etc. A kernel of the operating system driven on the SoC may include an input/output scheduler and a device driver for controlling the nonvolatile memory device 1500. The device driver may control an access performance of the nonvolatile memory device 1500 or a CPU mode, a DVFS level, etc. of the SoC based on the number of requests in a sync queue managed by the input/output scheduler.

A nonvolatile memory device and/or a memory controller according to an exemplary embodiment of the inventive concept may be packed by using various types of packages. For example, Package on Package (PoP), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline Integrated Circuit (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

While the inventive concept has been particularly shown and described with reference to exemplary embodiments thereof, it will be apparent to those of ordinary skill in the art that various changes in form and detail may be made thereto without departing from the spirit and scope of the present inventive concept as defined by the claims.

What is claimed is:

1. A mobile device, comprising:
a storage device;
a system-on-chip (SOC) including a central processing unit (CPU), a performance controller and a memory interface configured to access the storage device in response to a request of the CPU; and
a working memory including an input/output (I/O) scheduler and a device driver,
the I/O scheduler configured to detect real time processing requests and store the real time processing requests in a sync queue, and detect non-real time processing requests and store the non-real time processing requests in an async queue,
the device driver configured to adjust an access speed of the storage device based on the number of requests in the sync queue,
wherein the performance controller is configured to adjust a performance control mode of the SOC based on the number of requests in the sync queue,
wherein the performance control mode includes a dynamic voltage frequency scaling (DVFS) mode in which a driving voltage of the SOC and a frequency of a driving clock of the CPU are adjusted,
wherein the DVFS mode includes a plurality of levels, each level including a voltage and a frequency corresponding to a particular range of the number of requests in the synch queue, wherein a desired level is not activated until a prior activated level times out.

2. The mobile device of claim 1, wherein when the sync queue and the async queue are empty a low power mode of the mobile device is entered.

3. The mobile device of claim 1, wherein the CPU is a heterogeneous multi-core CPU.

4. The mobile device of claim 1, wherein the working memory includes a dynamic random access memory (DRAM).

5. The mobile device of claim 1, wherein the storage device includes a nonvolatile memory device.

6. The mobile device of claim 1, wherein the synch queue includes a plurality of read requests.

7. The mobile device of claim 1, wherein the async queue includes a plurality of write requests.

8. The mobile device of claim 1, wherein the device driver is configured to change the frequency of the driving clock of the CPU and a frequency of a data transfer clock of the memory interface.

9. The mobile device of claim 1, wherein the device driver is configured to change the driving voltage of the SOC and the frequency of the driving dock of the CPU.

10. The mobile device of claim 1, wherein the device driver is configured to change a number of cores operating in the CPU.

11. A mobile device, comprising:
a storage device;
a central processing unit (CPU);

a memory interface configured to interface with a high speed data transfer device;

a working memory including a module, the module including an input/output (I/O) scheduler, a performance control module and a device driver, the I/O scheduler including an aspic request queue configured to store non-real time processing requests by user input and a sync request queue configured to store real time processing requests by the user input, the device driver configured to adjust an access speed of the storage device based on the number of requests in the sync request queue, the performance, controller configured to adjust a performance control mode of the CPU based on the number of requests in the sync request queue, wherein the performance control mode includes a quality of service (QOS) mode in which a frequency of a driving clock of the CPU and a frequency of a data transfer clock of the memory interface are adjusted, wherein the QOS mode includes a plurality of steps, each step including a CPU frequency and a memory interface frequency corresponding to a particular range of the number of requests in the synch queue, wherein a desired step is not activated until a prior activated step times out.

12. The mobile device of claim 11, wherein the high speed data transfer device is the storage device.

13. The mobile device of claim 11, wherein the performance control mode of the mobile device includes a dynamic voltage frequency scaling (DVFS) mode in which a driving voltage of the mobile device and the frequency of the driving clock of the CPU are adjusted.

14. The mobile device of claim 13, wherein the DVFS mode includes a plurality of levels, each level including a voltage and a frequency corresponding to a particular range of the number of requests in the synch queue, wherein a desired level is not activated until a prior activated level times out.

15. The mobile device of claim 11, wherein the performance control mode of the mobile device includes a CPU mode in which a number of cores operating in the CPU is adjusted.

16. The mobile device of claim 15, wherein the CPU mode includes a plurality of modes, each mode including a core of the CPU to be activated for a particular range of the number of requests in the synch queue, wherein a desired mode is not activated until a prior activated mode times out.

17. The mobile device of claim 11, wherein the display screen is a touch screen.

18. The mobile device of claim 11, wherein the module is a kernel.

19. A method of controlling a mobile device, comprising:
storing real time processing requests in a sync queue and non real time processing requests in an async queue of an input/output (I/O) scheduler of a working memory;

determining, with a device driver of the working memory, a performance control mode of the mobile device based on the number of requests stored in the sync queue;

increasing a data transfer rate between a memory interface and a storage device when the number of requests in the sync queue is greater than a predetermined threshold; and decreasing the data transfer rate between the memory interface and the storage device when the number of requests in the sync queue is less than the predetermined threshold, wherein the data transfer rate is not increased or decreased until a time limit associated with a previous data transfer rate elapses, wherein the performance control mode includes a central processing unit (CPU) mode, a dynamic voltage frequency scaling (DVFS) mode or a quality of service (QOS) mode, wherein the CPU mode includes a plurality of modes, each mode including a core of the CPU to be activated for a particular range of the number of requests in the synch queue, wherein the DVFS mode includes a plurality of levels, each level including a voltage and a frequency corresponding to a particular range of the number of requests in the synch queue, wherein the QOS mode includes a plurality of steps, each step including a CPU frequency and a memory interface frequency corresponding to a particular range of the number of quests in the synch queue.

20. The method of claim 19, further comprising entering a low power mode of the mobile device when the sync queue and the async queue are empty.

21. The method of claim 19, wherein the sync queue includes a plurality of read requests and the async queue includes a plurality of write requests.

22. The method of claim 19, wherein the CPU mode is entered prior to the QOS mode and the DVFS mode.

* * * * *